(12) United States Patent
Kondo

(10) Patent No.: US 9,338,381 B2
(45) Date of Patent: May 10, 2016

(54) SOLID-STATE IMAGE-PICKUP DEVICE, IMAGE-PICKUP DEVICE, AND SIGNAL READING METHOD

(71) Applicant: OLYMPUS CORPORATION, Tokyo (JP)

(72) Inventor: Toru Kondo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 110 days.

(21) Appl. No.: 13/786,023

(22) Filed: Mar. 5, 2013

(65) Prior Publication Data

US 2013/0229560 A1   Sep. 5, 2013

(30) Foreign Application Priority Data

Mar. 5, 2012 (JP) ................................. 2012-048289

(51) Int. Cl.
*H04N 5/374* (2011.01)
*H04N 5/3745* (2011.01)

(52) U.S. Cl.
CPC ............. *H04N 5/374* (2013.01); *H04N 5/3745* (2013.01); *H04N 5/37452* (2013.01)

(58) Field of Classification Search
CPC ....... H04N 5/374; H04N 5/335; H04N 3/155; H04N 5/37452; H04N 5/3745; H04N 5/37457; H04N 5/3575; H04N 3/1575; H01L 27/14831; H01L 27/14643; H01L 27/14634; H01L 27/14636; H01L 27/1464; H01L 31/02
See application file for complete search history.

(56) References Cited

U.S. PATENT DOCUMENTS

| 7,750,958 B1* | 7/2010 | Dierickx ....................... 348/294 |
| 8,149,312 B2* | 4/2012 | Kwon ........................... 348/308 |
| 8,174,598 B2* | 5/2012 | Ebihara ......................... 348/296 |
| 8,987,646 B2* | 3/2015 | De Witt et al. ............. 250/208.1 |
| 2002/0190215 A1* | 12/2002 | Tashiro et al. ........... 250/370.11 |

(Continued)

FOREIGN PATENT DOCUMENTS

| JP | 11-196331 A | 7/1999 |
| JP | 2006-49361 A | 2/2006 |

(Continued)

OTHER PUBLICATIONS

Office Action dated Feb. 16, 2016, issued in counterpart Japanese Patent Application No. 2012-048289, with English Translation. (9 pages).

*Primary Examiner* — Luong T Nguyen
(74) *Attorney, Agent, or Firm* — Westerman, Hattori, Daniels & Adrian, LLP

(57) ABSTRACT

A solid-state image pickup device according to one aspect of the present invention includes, but is not limited to: first and second substrates on which circuit elements constituting a pixel; a coupler electrically coupling the first and second substrates; a first photoelectric conversion element on the first substrate; a first amplifier circuit on the first substrate; a first storing unit on the second substrate; and an output circuit on the second substrate. The first photoelectric conversion element performs photoelectric conversion on a first incident light to generate a first signal. The first amplifier circuit is coupled in series to the first photoelectric conversion element. The first amplifier circuit amplifies the first signal to generate a first amplified signal and output the first amplified signal to the coupler. The first storing unit stores the first amplified signal. The output circuit sequentially outputs the first amplified signal stored.

20 Claims, 7 Drawing Sheets

(56) References Cited

U.S. PATENT DOCUMENTS

2006/0023109 A1* 2/2006 Mabuchi et al. .............. 348/340
2008/0278614 A1* 11/2008 Ohtsuki et al. ................ 348/308
2010/0079632 A1 4/2010 Walschap et al.

FOREIGN PATENT DOCUMENTS

| JP | 2007-228460 A | 9/2007 |
| JP | 2009-170448 A | 7/2009 |
| JP | 2010-219339 A | 9/2010 |

* cited by examiner

SOLID-STATE IMAGE-PICKUP DEVICE, IMAGE-PICKUP DEVICE, AND SIGNAL READING METHOD

BACKGROUND OF THE INVENTION

1. Field of the Invention

The present invention relates to a solid-state image pickup device, an image pickup device, and a signal reading method.

Priority is claimed on Japanese Patent Application No. 2012-048289, filed Mar. 5, 2012, the content of which is incorporated herein by reference.

2. Description of the Related Art

Recently, image pickup devices, such as video cameras and electronic still cameras, have been widespread. Those image pickup devices (hereinafter, "cameras") include CCD (charge coupled device) image pickup devices and amplification solid-state image pickup devices. An amplification solid-state image pickup device includes multiple pixels arranged in a two-dimensional matrix. Additionally, an amplification solid-state image pickup device includes: a photoelectric converter provided in a pixel receiving light and configured to generate and store signal charge; and an amplifying unit provided in the pixel and configured to amplify the pixel signal and output the amplified pixel signal as an output signal.

Amplification solid-state image pickup devices include solid-state image pickup devices including a junction field effect transistor used as an amplifying unit, CMOS (complementary metal oxide semiconductor) solid-state image pickup devices, and the like.

Conventionally, general CMOS solid-state image pickup devices (hereinafter, "solid-state image pickup devices") uses a method of sequentially reading, for each row, signal charge generated and stored by an photoelectric converter in each of pixels arranged in a two-dimensional matrix. Regarding this reading method, the timing of exposure by the photoelectric converter in each pixel depends on the start and end of reading the signal charge, and the timing of exposure differs for each row. For this reason, in a case where a subject moving fast is imaged using such a CMOS solid-state image pickup device, the subject is occasionally distorted on the picked-up image.

As an exposure method to avoid the distortion of the subject, a simultaneous image pickup function has been proposed. The simultaneous image pickup function is a function of simultaneously exposing all pixels, thereby achieving synchronization of generation and storing of signal charge (hereinafter, "global shutter function"). Purposes of CMOS solid-state image pickup devices with the global shutter function have been increasing.

It is necessary for a CMOS solid-state image pickup device with the global shutter function to include a storing capacitor with a light blocking effect in order to store signal charge generated by a photoelectric converter until the end of reading. In such a CMOS solid-state image pickup device with the global shutter function, all pixels are simultaneously exposed. Thereafter, the signal charge generated by each photoelectric converter is transferred and temporarily stored in each storing capacitor simultaneously for all the pixels. Then, the signal charge stored in the storing capacitors are sequentially converted and read at predetermined timings.

Japanese Patent Application Laid-Open Publication No. 2006-49361 (hereinafter, "Patent Document 1") discloses a solid-state image pickup device having a structure such that an MOS image sensor chip and a signal processing chip are coupled by micro bumps. The MOS image sensor chip includes micro pads formed on a wiring layer side thereof for each unit cell. The MOS image sensor chip includes micro pads formed on the wiring layer side and arranged at positions corresponding to those of the micro pads of the MOS image sensor chop.

Japanese Patent Application Laid-Open Publication No. 2010-219339 (hereinafter, "Patent Document 2") discloses a method of avoiding an increase in area of a chip (mounting area) of a solid-state image pickup device. In this method, a first substrate on which a photoelectric converter is formed is placed over a second substrate on which multiple MOS transistors are formed. The first and second substrates are separately formed and electrically coupled to each other.

Regarding the technology disclosed in Patent Document 1, a cell of the MOS image sensor chip includes a photoelectric conversion element, an amplifier transistor, and the like (see FIGS. 5 and 12). The cell of the signal processing chip digitalizes the signal output from the cell of the MOS image sensor chip, and then stores the digitalized signal in a memory (FIGS. 8 and 9).

Regarding the technology disclosed in Patent Document 2, circuit elements constituting a pixel with the conventional global shutter function are allocated onto two separated substrates (see FIG. 9). For this reason, it is possible to avoid an increase in the area of the chip. Additionally, according to the structure such that the first substrate is placed over the second substrate, it is possible to prevent noise due to the incident light entering the pixels in the idle period from moving from the MOS image sensor chip to the signal processing chip. The idle period is a period until the signal charge stored in the storing capacitor of the MOS image sensor chip is read. Therefore, it is possible to avoid deterioration of the signal quality caused by the noise.

SUMMARY

A solid-state image pickup device according to one aspect of the present invention includes, but is not limited to: first and second substrates on which circuit elements constituting a pixel are arranged; and a coupler electrically coupling the first and second substrates. The pixel includes, but is not limited to: n photoelectric conversion elements on the first substrate where n is an integer of two or more; n amplifier circuits on the first substrate; n signal storing circuits on the second substrate; and an output circuit on the second substrate. The n photoelectric conversion elements are configured to respectively generate n electric conversion signals. The n amplifier circuits are configured to amplify the n electric conversion signals and output n amplified signals, respectively. The n signal storing circuits are respectively associated with the n photoelectric conversion elements. The n signal storing circuits are configured to respectively store the n amplified signals. The output circuit is configured to sequentially output the n amplified signals respectively stored in the a signal storing circuits, as output signals from the pixel. The n photoelectric conversion elements are grouped into one or more groups based on arrangement positions thereof on the first substrate. The coupler electrically couples a pixel output node to which the n amplified signals are output, to the n signal storing circuits.

An image pickup device according to another aspect of the present invention includes, but is not limited to: first and second substrates on which circuit elements constituting a pixel are arranged; and a coupler electrically coupling the first and second substrates. The pixel includes, but is not limited to: n photoelectric conversion elements on the first substrate where n is an integer of two or more; n amplifier circuits on the first substrate; n signal storing circuits on the second substrate; and an output circuit on the second substrate. The n photoelectric conversion elements are configured to respectively generate n electric conversion signals. The n amplifier circuits are configured to amplify the n electric conversion signals and output n amplified signals, respectively. The n signal storing circuits are respectively associated with the n photoelectric conversion elements. The n signal storing circuits are configured to respectively store the n amplified signals. The output circuit is configured to sequentially output the n amplified signals respectively stored in the a signal storing circuits, as output signals from the pixel. The n photoelectric conversion elements are grouped into one or more groups based on arrangement positions thereof on the first substrate. The coupler electrically couples a pixel output node to which the n amplified signals are output, to the n signal storing circuits.

A signal reading method according to another aspect of the present invention includes, but is not limited to, the following processes. Photoelectric conversion is performed on a first incident light to generate a first signal. The first incident light enters a first photoelectric conversion element on a first substrate of two substrates on which circuit elements constituting a pixel are arranged. The first signal is amplified to generate a first amplified signal. The first amplified signal is output to a coupler electrically coupling the first and second substrates. The first amplified signal is stored in a first storing circuit on a second substrate of the two substrates. The first amplified signal stored is sequentially output.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will now be described herein with reference to illustrative embodiments. The accompanying drawings explain a solid-state image pickup device, an image pickup device, and a signal reading method in the embodiments. The size, the thickness, and the like of each illustrated portion might be different from those of each portion of an actual device.

Those skilled in the art will recognize that many alternative embodiments can be accomplished using the teachings of the present invention and that the claimed invention is not limited to the embodiments illustrated herein for explanatory purposes.

Figure 1:
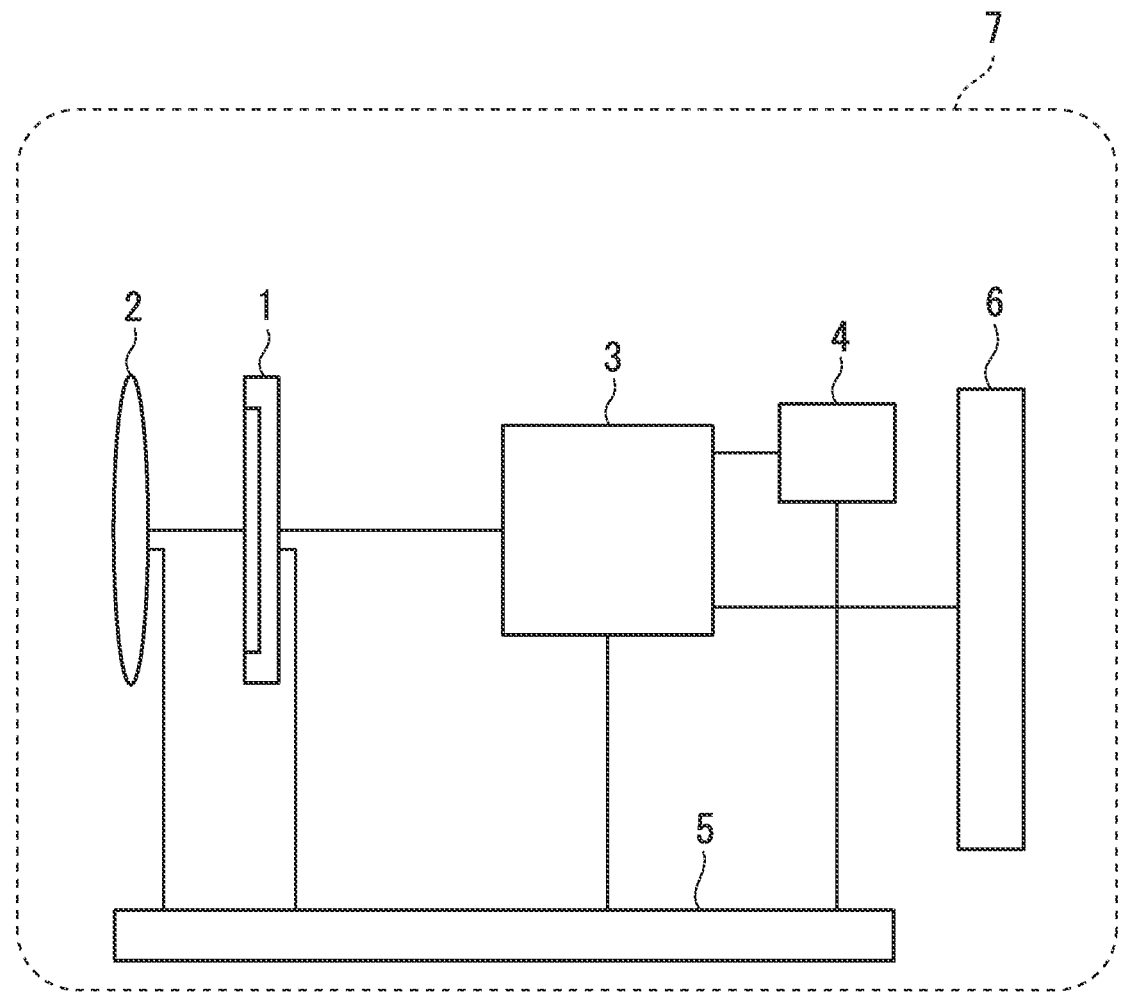
FIG. 1 is a block diagram illustrating a schematic configuration of a digital camera according to embodiments of the present invention.

FIG. 1 is a block diagram illustrating a schematic configuration of a digital camera 7 (such as a digital single-lens camera system) according to embodiments of the present invention. Each constituent element shown in FIG. 1 can be implemented by hardware, such as a CPU (central processing unit) and a memory of a computer, or by software, such as a computer program. Here, each constituent element is illustrated as a functional block implemented by a combination of such hardware and software. Accordingly, those skilled in the art will recognize that various embodiments of these functional blocks can be implemented by combinations of hardware and software.

The digital camera 7 shown in FIG. 1 includes: a lens unit 2; a solid-state image pickup device 1; an image signal processing device 3; a recording device 4; a camera control device 5; and a display device 6.

The lens unit 2 is drive-controlled by the camera control device 5. For example, zoom, focus, aperture, and the like of the lens unit 2 are drive-controlled by the camera control device 5. Thus, the lens unit 2 forms a subject image on the solid-state image pickup device 1.

The solid-state image pickup device 1 is driven and controlled by the camera control device 5. The solid-state image pickup device 1 is an MOS solid-state image pickup device that converts into an image signal, a light entering the solid-state image pickup device 1 via the lens unit 2.

The image signal processing device 3 performs on image signals output from the solid-state image pickup device 1, processes such as amplification of the signals, conversion of the signals into image data, various correction, and compression of the image data. The image signal processing device 3 uses a memory (not shown) as temporal storing means that stores image data in each process.

The recording device 4 is a detachable recording medium, such as a semiconductor memory. The recording device 4 performs recording and reading of image data.

The display device 6 is a display device, such as a liquid crystal display, which displays images based on image data processed by the image signal processing device 3 or image data read from the recording device 4.

The camera control device 5 is a control device that controls the entire digital camera 7.

First Embodiment

Figure 2:
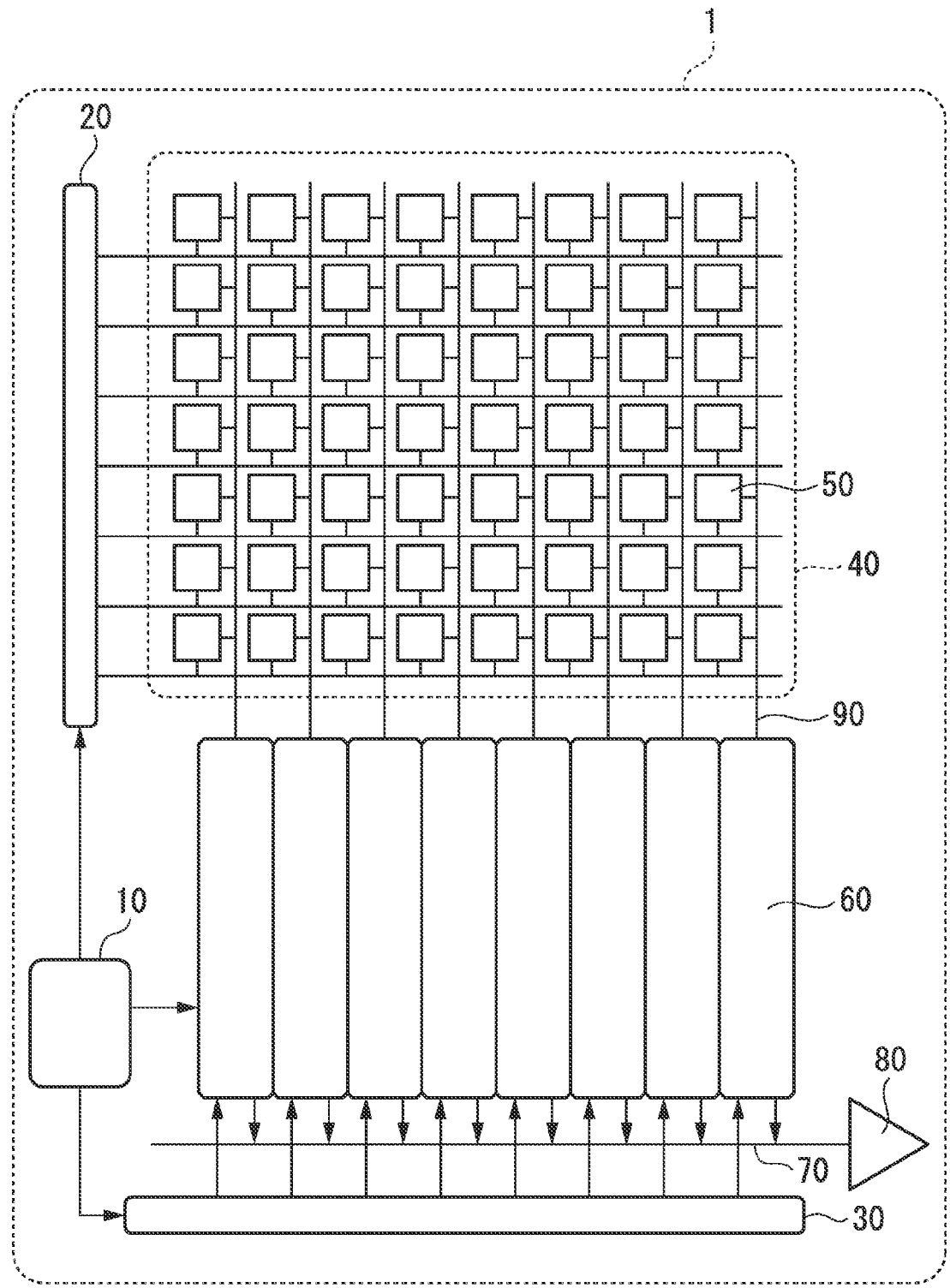
FIG. 2 is a block diagram illustrating a schematic configuration of a solid-state image pickup device according to a first embodiment of the present invention.

Hereinafter, a solid-state image pickup device 1 of the first embodiment mounted on the digital camera 7 is explained. FIG. 2 is a block diagram illustrating a schematic configuration of the solid-state image pickup device 1 according to the first embodiment. In FIG. 2, the solid-state image pickup device 1 includes: a solid-state image pickup device control signal generation circuit 10; a vertical reading control circuit 20; a horizontal reading control circuit 30; an image array unit 40 including multiple unit pixels 50; a column signal processing circuit 60; and an output amplifier 80. FIG. 2 shows an example of the pixel array unit 40 including multiple unit pixels 50 two-dimensionally arranged in seven rows and eight columns.

The solid-state image pickup device control signal generation circuit 10 controls the vertical reading control circuit 20, the horizontal reading control circuit 30, and the column signal processing circuit 60.

The vertical reading control circuit 20 controls each unit pixel 50 in the pixel array unit 40 under control of the solid-state image pickup device control signal generation circuit 10. Thus, the vertical reading control circuit 20 outputs an image signal from each unit pixel 50. The vertical reading control circuit 20 outputs, for each row, a control signal for controlling the unit pixels 50 arranged in the row of the pixel array unit 40. Here, the details of a method for the vertical reading control circuit 20 to control the unit pixels 50 will be explained later.

Each unit pixel 50 in the pixel array unit 40 converts incident light into an image signal. In accordance with the control signal received from the vertical reading control circuit 20, the unit pixel 50 outputs the image signal associated with the incident light to a vertical signal line 90. Circuit elements constituting each unit pixel 50 are arranged on first and second substrates. The first and second substrates are coupled to each other in the unit pixel 50. The details of the unit pixel 50 will be explained later.

The column signal processing circuit 60 is arranged for each column of the pixel array unit 40. Under control of the solid-state image pickup device control signal generation circuit 10, the column signal processing circuit 60 performs a circuit process, such as noise suppression, on the image signals output from the unit pixels 50 in each column to the vertical signal line 90. For example, the column signal processing circuit 60 is a circuit that performs CDS (correlated double sampling), signal amplification, AD conversion, and the like. Under control of the horizontal reading control circuit 30, the column signal processing circuit 60 outputs to a horizontal signal line 70, the output signal resulting from the process performed on the image signal.

The horizontal reading control circuit 30 sequentially read to the horizontal signal line 70, the output signal output from the column signal processing circuit 60 provided for each column. The output signals output from the column signal processing circuit 60 to the horizontal signal line 70 are output outside of the solid-state image pickup device 1 via the output amplifier 80.

Figure 3:
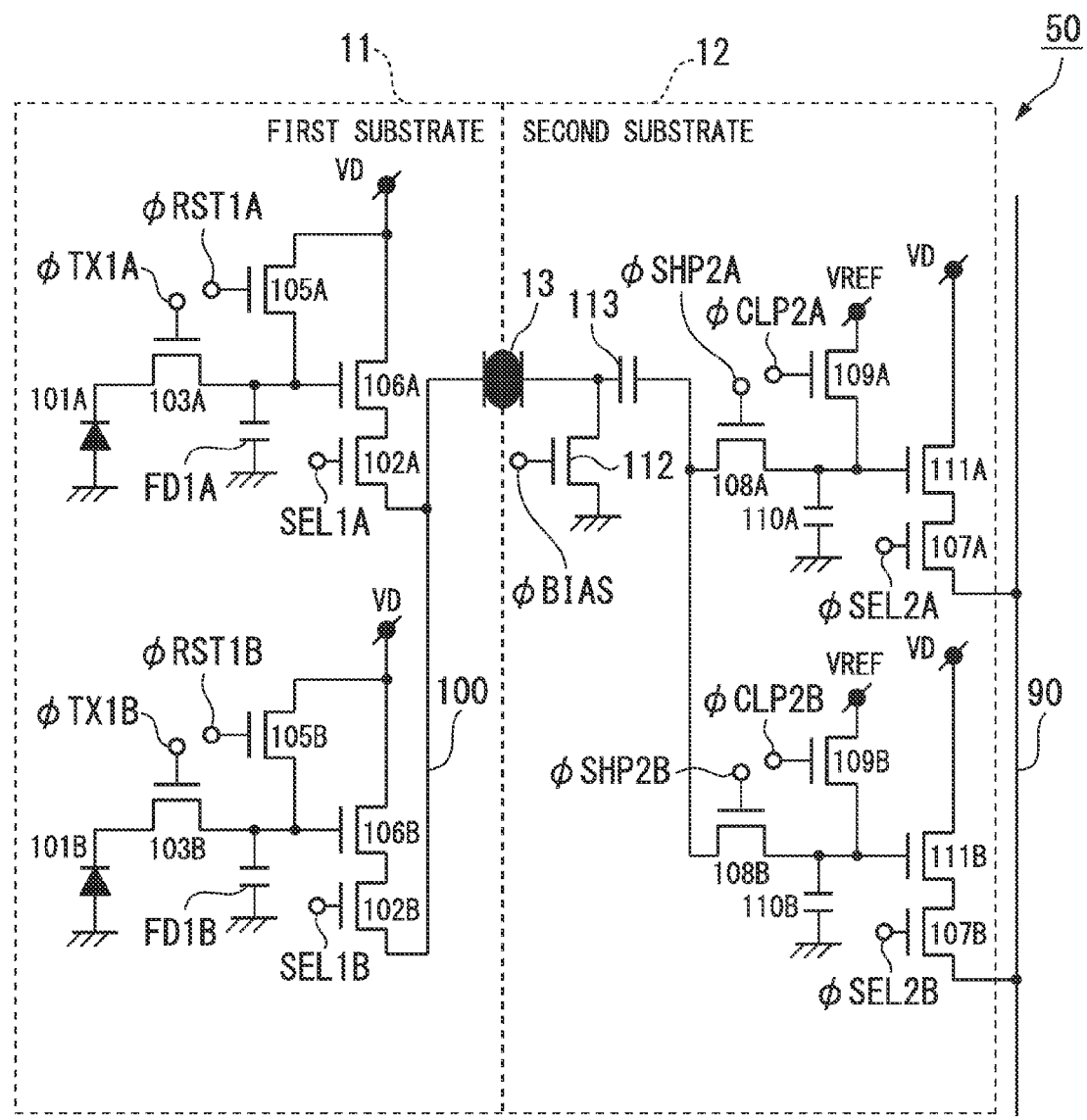
FIG. 3 is a circuit diagram illustrating a schematic configuration of a unit pixel included in a pixel array unit of the solid-state image pickup device according to the first embodiment.

Hereinafter, the unit pixel 50 of the pixel array unit 40 in the solid-state image pickup device 1 according to the first embodiment is explained. FIG. 3 is a circuit diagram illustrating a schematic configuration of the unit pixel 50 of the pixel array unit in the solid-state image pickup device 1 according to the first embodiment. FIG. 3 shows one unit pixel 50. The unit pixel 50 converts incident light into an image signal and outputs the image signal to the vertical signal line 90. As shown in FIG. 3, each of circuit elements constituting the unit pixel 50 is allocated either on a pixel unit 1 of the first substrate or a storing circuit 12 of the second substrate.

In FIG. 3, the unit pixel 50 includes: photoelectric converters 101A and 101B; pixel shared transistors 102A and 102B; transfer transistors 103A and 103B; pixel reset transistors 105A and 105B; first amplifier transistors 106A and 106B; select transistors 107A and 107B; in-pixel sample-hold transistors 108A and 108B; in-pixel clamp transistors 109A and 109B; electric charge storing units 110A and 110B; second amplifier transistors 111A and 111B; a pixel load transistor 112; and an in-pixel clamp capacitor 113. The photoelectric converters 101A and 101B, the pixel shared transistors 102A and 102B, the transfer transistors 103A and 103B, the pixel reset transistors 105A and 105B, and the first amplifier transistors 106A and 106B are placed on the first substrate. The select transistors 107A and 107B, the in-pixel sample-hold transistors 108A and 108B, the in-pixel clamp transistors 109A and 109B, the electric charge storing units 110A and 110B, the second amplifier transistors 111A and 111B, the pixel load transistor 112, and the in-pixel clamp capacitor 113 are placed on the second substrate. The pixel unit 11 of the first substrate and the storing circuit 12 of the second substrate are coupled via an inter-substrate coupler 13.

FIG. 3 shows an example of the unit pixel 50 including two photoelectric converters (photoelectric converters 101A and 101B). In FIG. 3, a reference symbol of "A" or "B" is appended to the reference numeral of each circuit element of the unit pixel 50, thus representing a row of the pixel array unit 40 in which that circuit element is placed. More specifically, the reference symbol "A" represents a circuit element placed in an odd-numbered row of the pixel array unit 40. The reference symbol "B" represents a circuit element placed in an even-numbered row of the pixel array unit 40. Hereinafter, when explanations are given without specifying a row of the pixel array unit 40, only the reference number is mentioned without appending thereto the reference symbol of "A" or "B".

The inter-substrate coupler 13 is a coupler for electrically coupling the first and second substrates to each other. For example, a bump formed by evaporation, plating, or the like, is used as the inter-substrate coupler 13. Here, the space between the first and second substrates may be filled with an insulating member, such as adhesive. Transmission and reception of signals are performed between the first and second substrates via the inter-substrate coupler 13. In the unit pixel 50 shown in FIG. 3, the pixel shared transistors 102A and 102B in the pixel unit 11 of the first substrate are coupled, via the inter-substrate coupler 13, to the pixel load transistor 112 and the in-pixel clamp capacitor 113 in the storing circuit 12 of the second substrate.

Each of the photoelectric converters 101A and 101B performs photoelectric conversion on incident light to generate signal charge, and stores the generated signal charge as a photoelectric conversion signal.

Node capacitors FD1A and FD1B are capacitors respectively associated with nodes coupled to gate terminals of the first amplifier transistors 106A and 106B. In FIG. 3, the node capacitors FD1A and FD1B are indicated by symbol marks representing capacitors.

In accordance with control signals φTX1A and φTX1B received from the vertical reading control circuit 20, the transfer transistors 103A and 103B transfer photoelectric conversion signals stored in the photoelectric converters 101A and 101B to gate terminals of the first amplifier transistors 106A and 106B, respectively. At this time, the photoelectric conversion signals transferred by the transfer transistors 103A and 103B are respectively stored in the associated node capacitors FD1A and FD1B.

The reference symbols "A" and "B" appended to the names of the "control signals φTX1A and φTX1B" represent associated rows of the image array unit 40, similarly to the reference symbols "A" and "B" appended to the reference numerals of circuit elements of the unit pixel 50.

The first amplifier transistors 106A and 106B output photoelectric conversion signals transferred to the gate terminals, that are, signal voltages associated with the photoelectric conversion signals stored in the associated node capacitors FD1A and FD1B, respectively.

The pixel reset transistors 105A and 105B reset the photoelectric conversion signals in the unit pixel 50 to the power voltage VD, in accordance with control signals φRST1A and φRST1B received from the vertical reading control circuit 20, respectively.

In accordance with the control signal φSEL1A or φSEL1B, each of the pixel shared transistors 102A and 102B outputs to the inter-substrate coupler 13 via a shared signal line 100, the signal voltage output from any one of the first amplifier transistor 106A or 106B, respectively. Thus, the signal voltage associated with the photoelectric conversion signal output from any one of the photoelectric converters 101A and 101B is read to the storing circuit 12 on the second substrate via the inter-substrate coupler 13.

In accordance with a control signal φBIAS received from the vertical reading control circuit 20, the pixel load transistor 112 operates as a load for one of the first amplifier transistors 106A and 106B which is outputting the signal voltage. The pixel load transistor 112 supplies current to the first amplifier transistor 106, in order to drive the first amplifier transistor 106 that is outputting the signal voltage.

The in-pixel clamp capacitor 113 is a capacitor that stores the signal voltage output from the first amplifier transistor 106.

In accordance with control signals φCLP2A and φCLP2B, the in-pixel clamp transistors 109A and 109B clamp the in-pixel clamp capacitor 113 and the associated electric charge storing units 110A and 110B to the fixed voltage VREF, respectively. Thus, the electric charge storing unit 110 and the in-pixel clamp capacitor 113 maintain the clamped fixed voltage VREF.

The in-pixel sample hold transistors 108A and 108B cause the electric charge storing units 110A and 110B to store the associated signals, in accordance with control signals φSHP2A and φSHP2B received from the vertical reading control circuit 20, respectively.

The electric charge storing units 110A and 110B are capacitors that store the respective signal voltages (signals having been subjected to the noise reduction process in the unit pixel 50) received via the associated in-pixel sample hold transistors 108A and 108B.

The unit pixel 50 performs a process of reducing noise due to leak current (dark current) by the configurations of the pixel load transistor 112, the in-pixel clamp transistor 109, the in-pixel sample hold transistor 108, the charge storing unit 110, and the in-pixel clamp capacitor 113. Then, the electric charge storing unit 110 stores the signal having been subjected to the noise reduction process. Here, as the electric charge storing unit 110, it is preferable to use a MIM (metal insulator metal) capacitor or a MOS (metal oxide semiconductor) capacitor which causes little leak current (dark current) per unit area. Thereby, tolerance to noises increases, thereby achieving signals with high-quality.

The second amplifier transistors 111A and 111B output the voltages of the gate terminals, that are, the signal voltages according to signals having been subjected to the noise reduction process and stored in the associated electric charge storing units 110A and 110B.

In accordance with control signals φSEL2A and φSEL2B received from the vertical reading control circuit 20, each of the select transistors 107A and 107B outputs to the vertical signal line 90, as a pixel signal output from the unit pixel 50, the signal voltage output from any one of the second amplifier transistors 111A and 111B, respectively.

Thus, the unit pixel 50 causes the pixel shared transistors 102A and 102B to selectively read to the inter-substrate coupler 13, the signal voltages associated with the photoelectric conversion signals generated by the photoelectric converters 101A and 101B performing photoelectric conversion on incident lights, respectively. Then, the unit pixel 50 stores the signals having been subjected to the noise suppression (signals having been subjected to the noise reduction process) in the respective electric charge storing units 110A and 110B respectively associated with the photoelectric converters 101A and 101B. Then, the unit pixel 50 sequentially reads to the vertical signal line 90, as pixel signals, the signal voltages associated with the signals having been subjected to the noise suppression (signals having been subjected to the noise reduction process) stored in the electric charge storing units 110A and 110B, respectively.

Here, FIG. 3 shows one example of the unit pixel 50 in a case where the two photoelectric converters 101A and 101B are arranged in one unit pixel 50. However, the configuration of one unit pixel is not limited the configuration shown in FIG. 3. For example, more photoelectric converters and circuit elements associated with those photoelectric converters may be included in one unit pixel.

Figure 4:
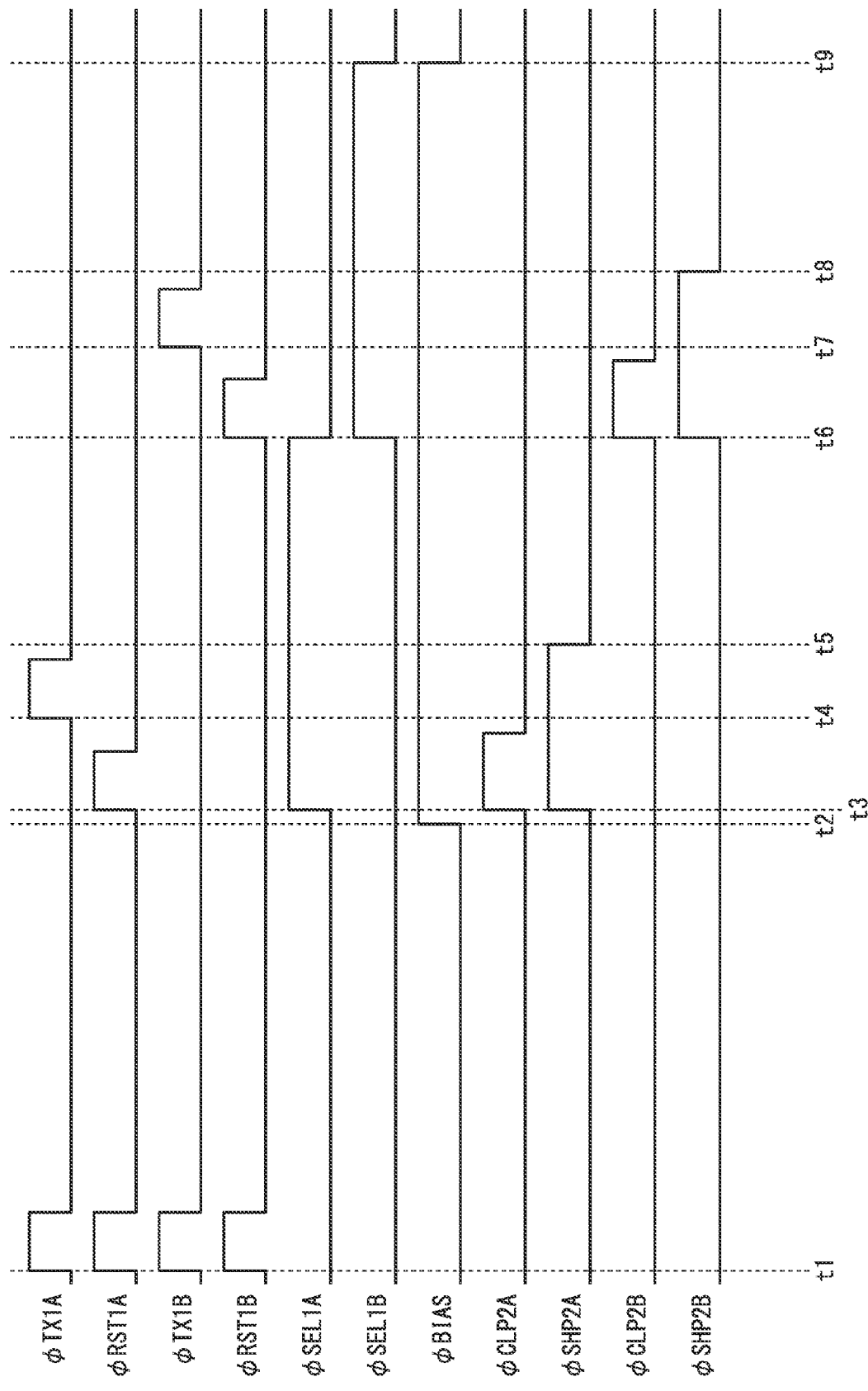
FIG. 4 is a timing chart illustrating a timing of driving the unit pixel included in the pixel array of the solid-state image pickup device according to the first embodiment.

Hereinafter, the timing of driving the unit pixel 50 in the solid-state image pickup device 1 according to the first embodiment is explained. FIG. 4 is a timing chart illustrating the timing of driving the unit pixel 50 of the pixel array unit 40 in the solid-state image pickup device 1 according to the first embodiment. The timing chart shown in FIG. 4 indicates the timing at which one unit pixel 50 is controlled by the vertical reading control circuit 20 in operation for the pixel array unit 40 to simultaneously expose all the unit pixels 50 and sequentially output pixel signals in each row to the vertical signal line 90. As shown in FIG. 3, the unit pixel 50 includes: the two photoelectric converters 101A and 101B arranged in one unit pixel 50; and the two electric charge storing units 110A and 110B respectively associated with the respective photoelectric converters 101A and 101B. For this reason, the timing chart shown in FIG. 4 indicates the timing of performing processes continuously for two rows of the pixel array unit 40.

Firstly, at a time t1, all the unit pixels 50 in the pixel array unit 40 are reset. More specifically, at the time t1, the vertical reading control circuit 20 simultaneously changes the control signals φTX1A and φTX1B and the control signals φRST1A and φRST1B to "H" level (high level), thereby turning on the transfer transistors 103A and 103B and the pixel reset transistors 105A and 105B. Thus, the photoelectric converters 101A and 101B and the node capacitors FD1A and FD1B arranged in all the unit pixels 50 in the pixel array unit 40 are reset.

Then, the vertical reading control circuit 20 simultaneously changes the control signals φTX1A and φTX1B and the control signals φRST1A and φRST1B to "L" level (low level), thereby releasing the reset of all the unit pixels 50 in the pixel array unit 40. Thus, all the unit pixels 50 in the pixel array unit 40 are simultaneously subjected to exposure. In other words, the photoelectric converters 101A and 101B arranged in all the unit pixels 50 in the pixel array unit 40 initiate storing photoelectric conversion signals generated by performing photoelectric conversion on incident lights.

Then, after a predetermined period elapses, that is, after an arbitrary exposure time elapses, a noise reduction process is performed from a time t2. The noise reduction process includes: reading the signal at the reset level and the photoelectric conversion signal from each unit pixel 50 in the pixel array unit 40 to the storing circuit 12 on the second substrate; and obtaining the difference between the signal at the reset level and the photoelectric conversion signal.

More specifically, at the time t2, the vertical reading control circuit 20 controls the control signal φBIAS, and thereby causes the pixel load transistor 112 to operate as the load for the first amplifier transistor 106. Then, at a time t3, the vertical reading control circuit 20 changes the control signal ϕSEL1A to "H" level, thereby turning on the pixel shared transistor 102A. Thus, the signal voltage output from the first amplifier transistor 106A is output to the storing circuit 12 via the shared signal line 100 and the inter-substrate coupler 13.

Additionally, the vertical reading control circuit 20 changes the control signal ϕRST1A to "H" level, thereby turning on the pixel reset transistor 105A and resetting the node capacitor FD1A. Thus, the signal voltage of the photoelectric converter 101A at the reset level is output from the first amplifier transistor 106A to the in-pixel clamp capacitor 113 via the shared signal line 100 and the inter-substrate coupler 13. Further, the vertical reading control circuit 20 changes the control signals ϕCLP2A and ϕSHP2A to "H" level, thereby turning on the in-pixel clamp transistor 109A and the in-pixel sample hold transistor 108A, and thus clamping the electric charge storing unit 110A and the in-pixel clamp capacitor 113.

Then, the vertical reading control circuit 20 changes the control signal ϕRST1A to "L" level, thereby releasing the reset of the node capacitor FD1A. Additionally, the vertical reading control circuit 20 changes the control signal ϕCLP2A to "L" level, thereby releasing the clamping of the electric charge storing unit 110A.

Then, at a time t4, the vertical reading control circuit 20 changes the control signal ϕTX1A to "H" level, thereby turning on the transfer transistor 103A. Thus, the transfer transistor 103A transfers the photoelectric conversion signal stored in the photoelectric converter 101A to the gate terminal of the first amplifier transistor 106A. At this time, the photoelectric conversion signal transferred by the transfer transistor 103A is stored in the node capacitor FD1A. Thus, the photoelectric conversion signal generated by the photoelectric converter 101A, that is, the signal voltage associated with the photoelectric conversion signal, which is stored in the node capacitor FD1A, is output from the first amplifier transistor 106A to the in-pixel clamp capacitor 113 via the shared signal line 100 and the inter-substrate coupler 13. Then, the in-pixel clamp capacitor 113 outputs the difference between the signal voltage of the photoelectric converter 101A at the reset level and the signal voltage associated with the photoelectric conversion signal generated by the photoelectric converter 101A, that is, the signal voltage having been subjected to the noise reduction process.

Then, the vertical reading control circuit 20 changes the control signal ϕTX1A to "L" level, thereby terminating the transfer of the photoelectric conversion signal generated by the photoelectric converter 101A to the first amplifier transistor 106A. At a time t5, the vertical reading control circuit 20 changes the control signal ϕSHP2A to "L" level, thereby terminating the sample hold by the electric charge storing unit 110A. Thus, the electric charge storing unit 110A stores the signal voltage having been subjected to the noise reduction process, which is output from the in-pixel clamp capacitor 113.

Then, at a time t6, the vertical reading control circuit 20 changes the control signal ϕSEL1A to "L" level, thereby turning off the pixel shared transistor 102A, and thus disconnecting the first amplifier transistor 106A from the shared signal line 100.

So far, the photoelectric conversion signals generated by the photoelectric converters 101A in half of all the pixels in the solid-state image pickup device 1, that are, the photoelectric conversion signals generated by the photoelectric converters 101A in odd-numbered rows of the pixel array unit 40, among the photoelectric converters 101 arranged in all the unit pixels 50 included in the pixel array unit 40, have been subjected to the noise reduction process and stored in the electric charge storing units 110A. As shown in FIG. 3, one unit pixel 50 includes the two photoelectric converters 101A and 101B. Therefore, the vertical reading control circuit 20 subsequently performs a noise reduction process on the photoelectric conversion signal generated by the photoelectric converter 101B in the unit pixel 50 and store the resultant signal in the electric charge storing unit 110B.

More specifically, at a time t6, the vertical reading control circuit 20 changes the control signal ϕSEL1B to "H" level, thereby turning on the pixel shared transistor 102B. Thus, the pixel shared transistor 102B outputs the signal voltage output from the first amplifier transistor 106B to the storing circuit 12 on the second substrate via the shared signal line 100 and the inter-substrate coupler 13.

Additionally, the vertical reading control circuit 20 changes the control signal ϕRST1B to "H" level, thereby turning on the pixel reset transistor 105B and thus resetting the node capacitor FD1B. Thus, the signal voltage of the photoelectric converter 101B at the reset level is output from the first amplifier transistor 106B to the in-pixel clamp capacitor 113 via the shared signal line 100 and the inter-substrate coupler 13. Further, the vertical reading control circuit 20 changes the control signals ϕCLP2B and ϕSHP2B to "H" level, thereby turning on the in-pixel clamp transistor 109B and the in-pixel sample hold transistor 108B, and thus clamping the electric charge storing unit 110B and the in-pixel clamp capacitor 113.

Then, the vertical reading control circuit 20 changes the control signal ϕRST1B to "L" level, thereby releasing the reset of the node capacitor FD1B. Additionally, the vertical reading control circuit 20 changes the control signal ϕCLB2B to "L" level, thereby releasing the clamping of the electric charge storing unit 100B.

Then, at a time t7, the vertical reading control circuit 20 changes the control signal ϕTX1B to "H" level, thereby turning on the transfer transistor 103B. Thus, the transfer transistor 103B transfers the photoelectric conversion signal stored in the photoelectric converter 101B to the gate terminal of the first amplifier transistor 106B. At this time, the photoelectric conversion signal transferred by the transfer transistor 103B is stored in the node capacitor FD1B. Thus, the photoelectric conversion signal generated by the photoelectric converter 101B, that is, the signal voltage associated with the photoelectric conversion signal stored in the node capacitor FD1B, is output from the first amplifier transistor 106B to the in-pixel clamp capacitor 113 via the shared signal line 100 and the inter-substrate coupler 13. Then, the difference between the signal voltage of the photoelectric converter 101B at the reset level and the signal voltage associated with the photoelectric conversion signal generated by the photoelectric converter 101B, that is, the signal voltage having been subjected to the noise reduction process, is output.

Then, the vertical reading control circuit 20 changes the control signal ϕTX1B to "L" level, thereby terminating the transfer of the photoelectric conversion signal generated by the photoelectric converter 101B to the gate terminal of the first amplifier transistor 106B. At a time t8, the vertical reading control circuit 20 changes the control signal ϕSHP2B to "L" level, thereby terminating the sample hold by the electric charge storing unit 110B. Thereby, the electric charge storing unit 110B stores the signal charge having been subjected to the noise reduction process, which is output from the in-pixel clamp capacitor 113.

Then, at a time t9, the vertical reading control circuit 20 changes the control signal ϕSEL1B to "L" level, thereby turning off the pixel shared transistor 102B and thus disconnecting the first amplifier transistor 106B from the shared signal line 100. Then, the vertical reading control circuit 20 controls the control signal φBIAS, thereby terminating the operation of the pixel load transistor 112 as the load for the first amplifier transistor 106.

So far, the photoelectric conversion signals generated by the photoelectric converters in the remaining half of all the pixels in the solid-state image pickup device 1, that are, the photoelectric conversion signals generated by the photoelectric converters 101B arranged in even-numbered rows of the pixel array unit 40, among the photoelectric converters 101 arranged in all the unit pixels 50 included in the pixel array unit 40, have been subjected to the noise reduction process and stored in the electric charge storing unit 110B. Here, in a case where the unit pixel 50 further includes more photoelectric converters 101 and circuit elements associated with those photoelectric converters 101, subsequently, the signal voltages obtained by subjecting photoelectric conversion signals generated by the other (remaining) photoelectric converters 101 to a noise reduction process are stored in the associated electric charge storing units 110 in a similar manner.

Then, the vertical reading control circuit 20 controls the control signals φSEL2 (the control signals φSEL2A and φSEL2B in the case of the first embodiment) row by row. Thus, the vertical reading control circuit 20 sequentially outputs to the vertical signal line 90, the signal voltages having been subjected to the noise reduction process, which are stored in the electric charge storing units 110 (the electric charge storing units 110A and 110B in the case of the first embodiment).

As explained above, the unit pixel 50 of the pixel array unit 40 in the solid-state image pickup device 1 according to the first embodiment performs the noise reduction process on the photoelectric conversion signals generated by the photoelectric converters 101 arranged in all the unit pixels 50 and stores the signal voltages having been subjected to the noise reduction process in the electric charge storing units 110. Then, the unit pixel 50 sequentially outputs to the vertical signal line 90, as pixel signals, the signal voltages having been subjected to the noise reduction process. At this time, the solid-state image pickup device 1 according to the first embodiment instantaneously performs the operation of reading the photoelectric conversion signals from the photoelectric converters 101 arranged in all the unit pixels 50 (two reading operations for the odd-numbered rows and the even-numbered rows in the case of the first embodiment). For this reason, the solid-state image pickup device 1 according to the first embodiment can store the photoelectric conversion signals in the electric charge storing units 110 at substantially the same timing as the timing for the conventional solid-state image pickup device with the global shutter function. In other words, it is possible to achieve substantially the same synchronism of generation and storing of photoelectric conversion signals as that for the conventional solid-state image pickup device with the global shutter function.

Additionally, the unit pixel 50 of the pixel array unit 40 in the solid-state image pickup device 1 according to the first embodiment causes the storing circuit 12 on the second substrate to perform the noise reduction process on the photoelectric conversion signals generated by the photoelectric converters 101 arranged in the pixel unit 11 on the first substrate. Thus, it is possible for the unit pixel 50 of the first embodiment to prevent noises due to the light entering the unit pixel 50 during an idle period from moving from the pixel unit 11 to the storing unit 12. The idle period is a period until the signal voltages having been subjected to the noise reduction process and stored in the electric charge storing units 110 are read as pixel signals. Accordingly, it is possible for the solid-state image pickup device 1 of the first embodiment to prevent deterioration of the signal quality caused by the noises due to the incident light.

Further, when the photoelectric conversion signals generated by the photoelectric converters 101 arranged in the pixel unit 11 on the first substrate are output to the storing circuits 12 on the second substrate, the unit pixel 50 of the pixel array unit in the solid-state image pickup device 1 according to the first embodiment causes the first amplifiers transistors 106 to amplify and output those photoelectric conversion signals. Thus, the unit pixel 50 of the first embodiment can prevent the noises due to leak current (dark current) generated in the electric charge storing units 110. Additionally, the unit pixel 50 of the first embodiment groups, in units of rows, the photoelectric conversion signals amplified by the first amplifier transistors arranged in the pixel unit 11 on the first substrate. Then, the unit pixel 50 of the first embodiment sequentially selects the photoelectric conversion signals amplified by the respective first amplifier transistors 106 and outputs the selected photoelectric conversion signals to the storing circuits 12 on the second substrate. Thus, the unit pixel 50 of the first embodiment can reduce the number of inter-substrate couplers 13 and in-pixel clamp capacitors 113 to be arranged in the unit pixel 50. Accordingly, the unit pixel 50 of the first embodiment can reduce the area of the electric charge storing units 110 arranged in the unit pixel 50. Further, it is possible to suppress the effect of the leak current (dark current) generated in the electric charge storing units 110. Thus, the solid-state image pickup device 1 of the first embodiment can prevent deterioration of the signal quality caused by the noises due to the leak current (dark current) generated in the electric charge storing units.

Moreover, according to the solid-state image pickup device 1 of the first embodiment, it is possible to reduce the number of the inter-substrate couplers 13 each coupling the pixel unit 11 on the first substrate and the storing circuit 12 on the second substrate by the number of grouped rows of the pixel array unit 40. For this reason, it is possible to make larger the connection pitch of the two adjacent inter-substrate couplers 13 in the pixel array unit 40. Thus, it is possible to suppress a decrease in the yield which occurs when the first and second substrates are coupled. Additionally, it is possible to make the size of the inter-substrate coupler 13 larger by making the connection pitch of two adjacent inter-substrate couplers 13 larger, thereby further suppressing the deterioration of the yield.

The unit pixel 50 of the first embodiment causes the pixel shared transistors 102 to selectively read to the one inter-substrate coupler 13, the signal voltages associated with the two photoelectric conversion signals generated by the two photoelectric converters 101. Then, the unit pixel 50 stores the signals having been subjected to the noise suppression (signals having been subjected to the noise reduction process) in the electric charge storing units 110 associated with the respective photoelectric converters 101. Then, the unit pixel 50 sequentially reads to the vertical signal line 90, as pixel signals, the signal voltages associated with the signals having been subjected to the noise suppression (signals having been subjected to the noise reduction process) and stored in the respective electric charge storing units 110. Such a case has been explained in the first embodiment. However, the configuration of the one unit pixel is not limited to the configuration of the unit pixel 50 of the first embodiment such that the one unit pixel includes the two photoelectric converters 101 and the two circuit elements respectively associated with those photoelectric converters 101. Alternatively, for example, the number of pixel shared transistors to be arranged in the unit pixel may be increased so that the signal voltages associated with the photoelectric conversion signals generated by N photoelectric converters are selectively read to the one inter-substrate coupler, and the signals having been subjected to the noise suppression (signals having been subjected to the noise reduction process) are stored in the electric charge storing units associated with the respective photoelectric converters. In such a case, it is necessary to perform N times, the operation of reading the photoelectric conversion signals from the photoelectric converters and the operation of storing the signals having been subjected to the noise suppression (signals having been subjected to the noise reduction process) in the electric charge storing units, which are the processes from the time t3 to t6, or the processes from the time t6 to t9. N is the number of photoelectric converters arranged in the unit pixel. In this case, if the number of photoelectric converters N arranged in the unit pixel is increased, and thereby the operation of reading the photoelectric conversion signals from the photoelectric converters and the operation of storing the signals having been subjected to the noise suppression (signals having been subjected to the noise reduction process) have to be performed a greater number of times, there is a possibility that the synchronism of generation and storing of the photoelectric conversion signals will be lost. However, if the operation of reading the photoelectric conversion signals from the photoelectric converters and the operation of storing the signals having been subjected to the noise suppression (signals having been subjected to the noise reduction process) have to be performed only a few times, it is possible to ensure substantially the same synchronism of generation and storing of the photoelectric conversion signals as that for the conventional solid-state image pickup device with the global shutter function.

Additionally, the number of pixel shared transistors to be arranged in the unit pixel, that is, the number of inter-substrate couplers 13 and in-pixel clamp capacitors 113 to be arranged in the unit pixel 50, is increased, it is possible to make larger the area of the photoelectric storing units arranged in the unit pixel, and thereby suppress the effect of leak current (dark current) generated in the electric charge storing unit.

Conventionally, as a general method of arranging multiple photoelectric converters in one unit pixel, there is a generally known method of sharing one amplifier transistor among signals in the upstream of the amplifier transistor, that are, photoelectric conversion signals having not yet been subjected to amplification. However, if this method is used to increase the number of photoelectric converters arranged in one unit pixel, the capacitance of the capacitor associated with the node coupled to the gate terminal of the amplifier transistor (the node capacitors FD1A and FD1B in the case of the first embodiment) becomes large. Further, if the voltages of the photoelectric conversion signals generated by the respective photoelectric converters are lowered, noise increases, thereby causing deterioration of the signal quality. This is due to the relation of V=Q/C where Q denotes the electric charge, C denotes the capacitance, and V denotes the voltage. The unit pixel 50 of the first embodiment groups, in units of rows of the pixel array unit 40, the photoelectric conversion signals amplified by the first amplifier transistors 106. Thus, the inter-substrate coupler 13 and the in-pixel clamp capacitor 113 are shared among the multiple photoelectric converters 101 and circuit elements associated with the photoelectric converters 101. For this reason, according to the unit pixel 50 of the first embodiment, even if the number of photoelectric converters 101 and circuit elements associated with the photoelectric converters 101, which share the inter-substrate coupler 13 and the in-pixel clamp capacitor 113, the capacitances of the node capacitors FD1A and FD1B do not increase, thereby preventing deterioration of the signal quality.

Second Embodiment

Hereinafter, a solid-state image pickup device 1a mounted on the digital camera 7 according to a second embodiment of the present invention is explained. Regarding the solid-state image pickup device 1a of the second embodiment, a circuit configuration of a unit pixel of a pixel array unit differs from the circuit configuration of the unit pixel 50 of the pixel array unit 40 in the solid-state image pickup device 1 shown in FIG. 2. Because of the difference in the circuit configuration of the unit pixel, a method for a vertical reading control circuit included in the solid-state image pickup device 1a of the second embodiment to control the unit pixel differs from the method for the vertical reading control circuit included in the solid-state image pickup device 1 of the first embodiment to control the unit pixel.

Configurations of the other constituent elements included in the solid-state image pickup device 1a of the second embodiment are similar to those of the constituent elements included in the solid-state image pickup device 1 of the first embodiment. Therefore, like reference numerals are appended to like constituent elements between the solid-state image pickup device 1a of the second embodiment and the solid-state image pickup device 1 of the first embodiment, and explanations thereof are omitted here.

Hereinafter, a unit pixel of the pixel array unit 40 included in the solid-state image pickup device 1a of the second embodiment is denoted as a "unit pixel 52." Additionally, a vertical reading control circuit included in the solid-state image pickup device 1a of the second embodiment is denoted the same as the "vertical reading control circuit 20" in the solid-state image pickup device 1 of the first embodiment, since only a control method differs between the first and second embodiments. The details of a method for the vertical reading control circuit 20 included in the solid-state image pickup device 1a of the second embodiment to control the unit pixel 52 will be explained later.

Figure 5:
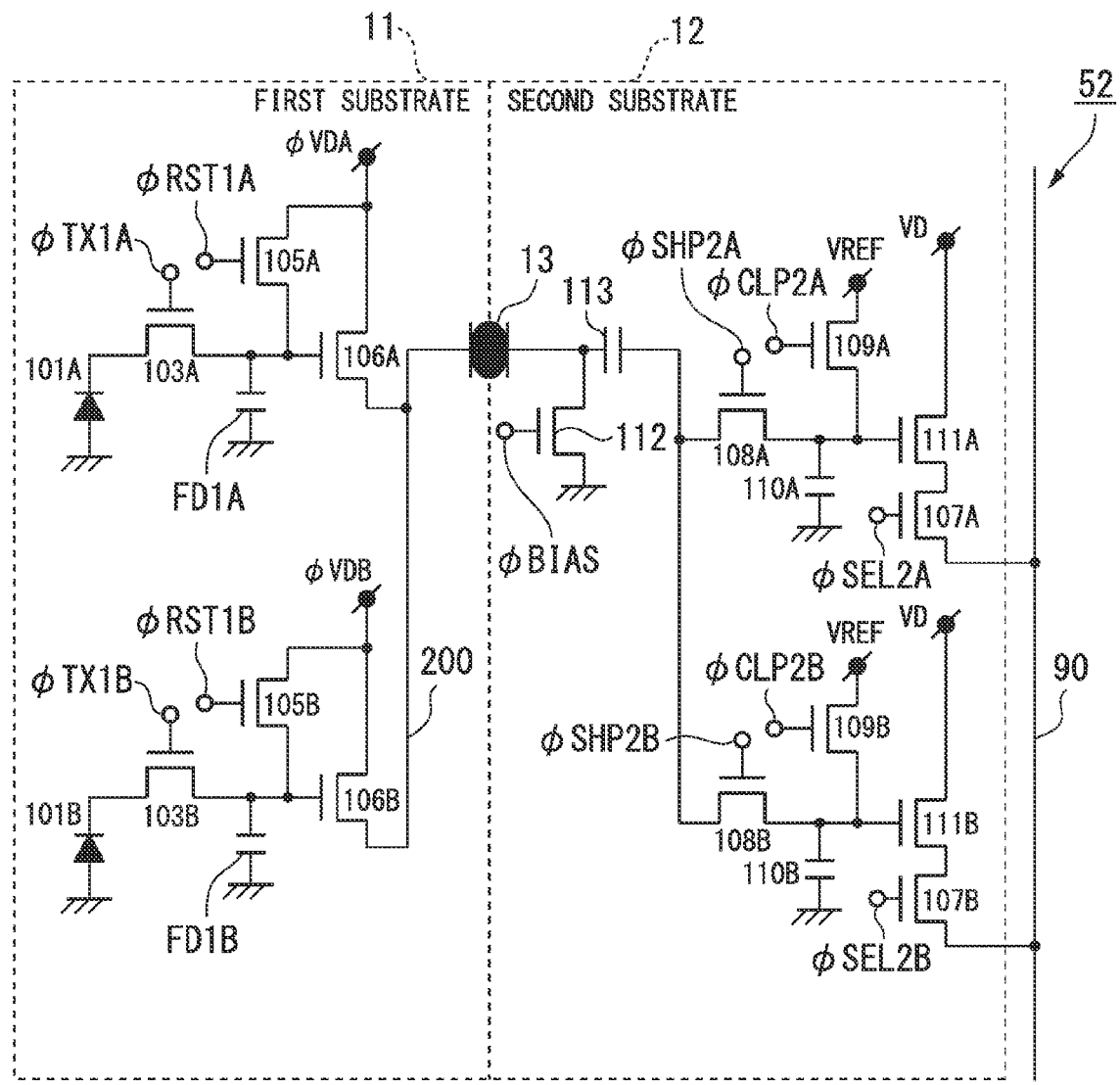
FIG. 5 is a circuit diagram illustrating a schematic configuration of a unit pixel included in a pixel array unit of a solid-state image pickup device according to a second embodiment of the present invention.

FIG. 5 is a circuit diagram illustrating a schematic configuration of the unit pixel 52 in the pixel array unit 40 included in the solid-state image pickup device 1a of the second embodiment. Similarly to the unit pixel 50 shown in FIG. 3, the unit pixel 52 converts incident light into a pixel signal, and outputs the pixel signal associated with the incident light to the vertical signal line 90 in accordance with the control signal received from the vertical reading control circuit 20. One unit pixel 52 is shown in FIG. 5. Regarding the solid-state image pickup device 1a of the second embodiment, as shown in FIG. 5, each circuit element in each unit pixel 52 is allocated either on the pixel unit 11 on the first substrate or the storing circuit 12 on the second substrate. Hereinafter, like reference numerals are appended to like circuit elements between the circuit elements of the unit pixel 52 and the circuit elements of the unit pixel 50 shown in FIG. 3.

In FIG. 5, the unit pixel 52 includes: photoelectric converters 101A and 101B; transfer transistors 103A and 103B; pixel reset transistors 105A and 105B; first amplifier transistors 106A and 106B; select transistors 107A and 107B; sample-hold transistors 108A and 108B; in-pixel clamp transistors 109A and 109B; electric charge storing units 110A and 110B; second amplifier transistors 111A and 111B; a pixel load transistor 112; and an in-pixel clamp capacitor 113. The photoelectric converters 101A and 101B, the transfer transistors 103A and 103B, the pixel reset transistors 105A and 105B, and the first amplifier transistors 106A and 106B are placed on the first substrate. The select transistors 107A and 107B, the sample-hold transistors 108A and 108B, the in-pixel clamp transistors 109A and 109B, the electric charge storing units 110A and 110B, the second amplifier transistors 111A and 111B, the pixel load transistor 112, and the in-pixel clamp capacitor 113 are placed on the second substrate. The pixel unit 11 of the first substrate and the storing circuit 12 of the second substrate are coupled via an inter-substrate coupler 13.

Similar to the unit pixel 50 shown in FIG. 3, FIG. 5 shows an example of the unit pixel 52 including two photoelectric converters (photoelectric converters 101A and 101B). Similar to the unit pixel 50 shown in FIG. 3, in FIG. 5, a reference symbol of "A" or "B" is appended to the reference numeral of each circuit element of the unit pixel 52, thus representing a row of the pixel array unit 40 in which that circuit element is placed. Hereinafter, when explanations are given without specifying a row of the pixel array unit 40, only the reference numeral is mentioned without appending thereto the reference symbol of "A" or "B".

The difference between the unit pixel 52 shown in FIG. 5 and the unit pixel 50 shown in FIG. 3 is in that the pixel shared transistors 102A and 102B, which are included in the unit pixel 50, are not included in the unit pixel 52. Because of this difference, in the unit pixel 52, output terminals (source terminals) of the first amplifier transistors 106A and 106B are coupled to the inter-substrate coupler 13 via a node (hereinafter, "shard signal line 200"). Additionally, in the unit pixel 52, drain terminals of the pixel reset transistor 105A and the first amplifier transistor 106A are coupled to a control signal φVDA, and drain terminals of the pixel reset transistor 105B and the first amplifier transistor 106B are coupled to a control signal φVDB, so that those circuit elements can be pulse-controlled. Thus, it is possible for the vertical reading control circuit 20 to control the bias voltages of the pixel reset transistor 105A and the first amplifier transistor 106A and the bias voltages of the pixel reset transistor 105B and the first amplifier transistor 106B. The other constituent elements of the unit pixel 52 have similar configurations to those of the constituent elements of the unit pixel 50 shown in FIG. 3.

In accordance with control signals φRST1A and φRST1B received from the vertical reading control circuit 20, the pixel reset transistors 105A and 105B resets the photoelectric conversion signals in the unit pixel 52 to the voltages associated with the control signals φVDA and φVDB coupled to the drain terminals and received from the vertical reading control circuit 20, respectively.

Based on the voltages associated with the control signals φVDA and φVDB coupled to the drain terminals and received from the vertical reading control circuit 20, the first amplifier transistors 106A and 106B output photoelectric conversion signals transferred to the gate terminals, that are, the signal voltages obtained by amplifying the photoelectric conversion signals stored in the node capacitors FD1A and FD1B associated with the gate terminals, respectively.

In the unit pixel 52, the vertical reading control circuit 20 controls the control signals φVDA and φVDB, and thereby outputs the signal voltages output from one of the first amplifier transistors 106A and 106B to the in-substrate coupler 13 via the shared signal line 200. In other words, in lieu of the pixel shared transistors 102A and 102B arranged in the unit pixel 50 shown in FIG. 3, the vertical reading control circuit 20 in the unit pixel 52 controls the control signals φVDA and φVDB, and thereby selectively read to the in-substrate coupler 13, the photoelectric conversion signals generated by the photoelectric converters 101A arranged in odd-numbered rows or the photoelectric conversion signals generated by the photoelectric converters 101A arranged in even-numbered rows. Thus, the signal voltage associated with any one of the photoelectric converters 101A and 101B is read to the storing unit 12 on the second substrate via the in-substrate coupler 13.

Thus, the unit pixel 52 selectively reads to the one inter-substrate coupler 13, the signal voltages associated with the photoelectric conversion signals generated by the photoelectric converters 101A and 101B performing photoelectric conversion on incident lights, respectively. Then, the unit pixel 52 stores the signals having been subjected to the noise suppression (signals having been subjected to the noise reduction process) in the respective electric charge storing units 110A and 110B respectively associated with the photoelectric converters 101A and 101B. Then, the unit pixel 52 sequentially reads to the vertical signal line 90, as pixel signals, the signal voltages associated with the signals having been subjected to the noise suppression (signals having been subjected to the noise reduction process) stored in the electric charge storing units 110A and 110B, respectively.

Here, FIG. 5 shows one example of the unit pixel 52 in a case where the two photoelectric converters 101A and 101B are arranged in one unit pixel 52. However, the configuration of one unit pixel is not limited to the configuration shown in FIG. 5, similarly to the case of the unit pixel 50 shown in FIG. 3. For example, more photoelectric converters and circuit elements associated with those photoelectric converters may be included in one unit pixel.

Figure 6:
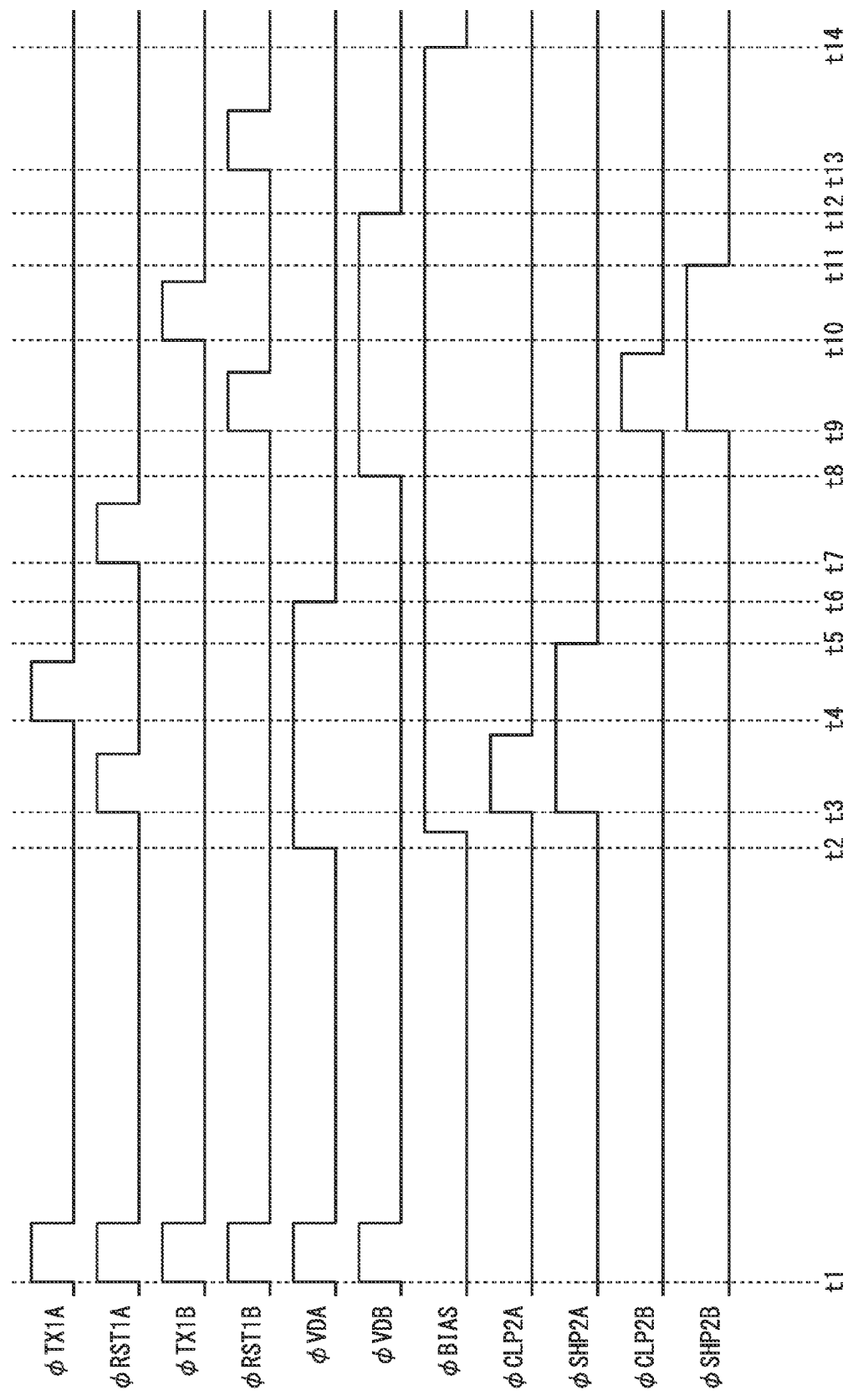
FIG. 6 is a timing chart illustrating a timing of driving the unit pixel included in the pixel array of the solid-state image pickup device according to the second embodiment.

Hereinafter, the timing of driving the unit pixel 52 in the solid-state image pickup device 1a according to the second embodiment is explained. FIG. 6 is a timing chart illustrating the timing of driving the unit pixel 52 of the pixel array unit 40 in the solid-state image pickup device 1a according to the second embodiment. Similar to the timing of driving the unit pixel 50 of the first embodiment shown in FIG. 4, the timing chart shown in FIG. 6 indicates the timing at which one unit pixel 52 is controlled by the vertical reading control circuit 20 in operation for the pixel array unit 40 to simultaneously expose all the unit pixels 50 and sequentially output pixel signals in each row to the vertical signal line 90. Here, as shown in FIG. 5, the unit pixel 52 includes: the two photoelectric converters 101A and 101B arranged in one unit pixel 52; and the two electric charge storing units 110A and 110B respectively associated with the photoelectric converters 101A and 101B. For this reason, similar to the timing of driving the unit pixel 50 of the first embodiment shown in FIG. 4, the timing chart shown in FIG. 6 indicates the timing of continuously performing processes for two rows of the pixel array unit 40.

Firstly, at a time t1, all the unit pixels 52 in the pixel array unit 40 are reset. More specifically, at the time t1, the vertical reading control circuit 20 controls the control signals φVDA and φVDB, thereby changing to the level of the power voltage VD, the drain terminals of the pixel reset transistor 105A and the first amplifier transistor 106A, and the drain terminals of the pixel reset transistor 105B and the first amplifier transistor 106B. Then, the vertical reading control circuit 20 simultaneously changes the control signals φTX1A and φTX1B and the control signals φRST1A and φRST1B to "H" level, thereby turning on the transfer transistors 103A and 103B and the pixel reset transistors 105A and 105B. Thus, the photoelectric converters 101A and 101B and the node capacitors FD1A and FD1B arranged in all the unit pixels 52 in the pixel array unit are reset.

Then, the vertical reading control circuit 20 simultaneously changes the control signals φTX1A and φTX1B and the control signals φRST1A and φRST1B to "L" level, thereby releasing the reset of all the unit pixels 52 in the pixel array unit 40. Thus, all the unit pixels 52 in the pixel array unit 40 are simultaneously subjected to exposure. In other words, the photoelectric converters 101A and 101B arranged in all the unit pixels 52 in the pixel array unit 40 initiate storing photoelectric conversion signals generated by performing photoelectric conversion on incident lights. Additionally, the vertical reading control circuit 20 changes to the level of the reference voltage GND, the drain terminals of the pixel reset transistor 105A and the first amplifier transistor 106A, and the drain terminals of the pixel reset transistor 105B and the first amplifier transistor 106B.

Then, after a predetermined period elapses, that is, after an arbitrary exposure time elapses, a noise reduction process is initiated at a time t2. The noise reduction process includes: reading the reset level signal and the photoelectric conversion signal from each unit pixel 52 in the pixel array unit 40 to the storing circuit 12 on the second substrate; and obtaining the difference between the reset level signal and the photoelectric conversion signal.

More specifically, at the time t2, the vertical reading control circuit 20 controls the control signal φVDA, thereby changing to the level of the power voltage VD, the drain terminals of the pixel reset transistor 105A and the first amplifier transistor 106A. Thus, the signal voltage output from the first amplifier transistor 106A is output to the storing circuit 12 on the second substrate via the shared signal line 200 and the inter-substrate coupler 13. Then, the vertical reading control circuit 20 controls the control signal φBIAS and thereby causes the pixel load transistor 112 to operate as the load for the first amplifier transistor 106.

Then, at a time t3, the vertical reading control circuit 20 changes the control signal φRST1A to "H" level, thereby turning on the pixel reset transistor 105A and resetting the node capacitor FD1A. Thus, the signal voltage of the photoelectric converter 101A at reset level is output from the first amplifier transistor 106A to the in-pixel clamp capacitor 113 via the shared signal line 200 and the inter-substrate coupler 13. Further, the vertical reading control circuit 20 changes the control signals φCLP2A and φSHP2A to "H" level, thereby turning on the in-pixel clamp transistor 109A and the in-pixel sample hold transistor 108A, and clamping the electric charge storing unit 100A and the in-pixel clamp capacitor 113.

Then, the vertical reading control circuit 20 changes the control signal φRST1A to "L" level, thereby releasing the reset of the node capacitor FD1A. Additionally, the vertical reading control circuit 20 changes the control signal φCLP2A to "L" level, thereby releasing the clamping of the electric charge storing unit 110A.

Then, at a time t4, the vertical reading control circuit 20 changes the control signal φTX1A to "H" level, thereby turning on the transfer transistor 103A. Thus, the transfer transistor 103A transfers the photoelectric conversion signal stored in the photoelectric converter 101A to the gate terminal of the first amplifier transistor 106A. At this time, the photoelectric conversion signal transferred by the transfer transistor 103A is stored in the node capacitor FD1A. Thus, the photoelectric conversion signal generated by the photoelectric converter 101A, that is, the signal voltage associated with the photoelectric conversion signal, which is stored in the node capacitor FD1A, is output from the first amplifier transistor 106A to the in-pixel clamp capacitor 113 via the shared signal line 100 and the inter-substrate coupler 13. Then, the in-pixel clamp capacitor 113 outputs the difference between the signal voltage of the photoelectric converter 101A at the reset level and the signal voltage associated with the photoelectric conversion signal generated by the photoelectric converter 101A, that is, the signal voltage having been subjected to the noise reduction process.

Then, the vertical reading control circuit 20 changes the control signal φTX1A to "L" level, thereby terminating the transfer of the photoelectric conversion signal generated by the photoelectric converter 101A to the first amplifier transistor 106A. At a time t5, the vertical reading control circuit 20 changes the control signal φSHP2A to "L" level, thereby terminating the sample hold by the electric charge storing unit 110A. Thus, the electric charge storing unit 110A stores the signal voltage having been subjected to the noise reduction process, which is output from the in-pixel clamp capacitor 113.

Then, at a time t6, the vertical reading control circuit 20 controls the control signal φVDA, thereby changing to the level of the reference voltage GND, the drain terminals of the pixel reset transistor 105A and the first amplifier transistor 106A. Then, at a time t7, the vertical reading control circuit 20 changes the control signal φRST1A to "H" level, thereby turning on the pixel reset transistor 105A. Thus, the voltage of the photoelectric conversion signal generated by the photoelectric converter 101A, which is stored in the node capacitor FD1A, that is, the voltage remaining in the node capacitor FD1A after being output to the in-pixel clamp capacitor 113, is cleared to the level of the reference voltage GND. Thus, the voltage of the gate terminal of the first amplifier transistor 106A is lowered in level. Thereby, the signal voltage associated with the photoelectric conversion signal generated by the photoelectric converter 101A is not output from the first amplifier transistor 106A, thus disconnecting the first amplifier transistor 106A from the shared signal line 200. Then, the vertical reading control circuit 20 changes the control signal φRST1A to "L" level.

So far, the photoelectric conversion signals generated by the photoelectric converters in half of all the pixels included in the solid-state image pickup device 1a, that are, the photoelectric conversion signals generated by the photoelectric converters 101A arranged in odd-numbered rows of the pixel array unit 40, among the photoelectric converters 101A arranged in all the unit pixels 52 included in the pixel array unit 40, have been subjected to the noise reduction process and stored in the electric charge storing unit 110A. As shown in FIG. 5, one unit pixel 52 includes the two photoelectric converters 101A and 101B. Therefore, the vertical reading control circuit 20 subsequently performs a noise reduction process on the photoelectric conversion signal generated by the photoelectric converter 101B in the unit pixel 52 and store the resultant signal in the electric charge storing unit 110B.

More specifically, at a time t8, the vertical reading control circuit 20 controls the control signal φVDB, thereby changing to the level of the power voltage VD, the drain terminals of the pixel reset transistor 105B and the first amplifier transistor 106B. Thus, the signal voltage output from the first amplifier transistor 106B is output to the storing circuit 12 on the second substrate via the shared signal line 200 and the inter-substrate coupler 13.

Then, at a time t9, the vertical reading control circuit 20 changes the control signal φRST1B to "H" level, thereby turning on the pixel reset transistor 105B and resetting the node capacitor FD1B. Thus, the signal voltage of the photoelectric converter 101B at the reset level is output from the first amplifier transistor 106B to the in-pixel clamp capacitor 113 via the shared signal line 200 and the inter-substrate coupler 13. Further, the vertical reading control circuit 20 changes the control signals φCLP2B and φSHP2B to "H" level, thereby turning on the in-pixel clamp transistor 109B and the in-pixel sample hold transistor 108B, and thus clamping the electric charge storing unit 110OB and the in-pixel clamp capacitor 113.

Then, the vertical reading control circuit 20 changes the control signal φRST1B to "L" level, thereby releasing the reset of the node capacitor FD1B. Additionally, the vertical reading control circuit 20 changes the control signal φCLB2B to "L" level, thereby releasing the clamping of the electric charge storing unit 110B.

Then, at a time t10, the vertical reading control circuit 20 changes the control signal φTX1B to "H" level, thereby turning on the transfer transistor 103B. Thus, the transfer transistor 103B transfers the photoelectric conversion signal stored in the photoelectric converter 101B to the gate terminal of the first amplifier transistor 106B. At this time, the photoelectric conversion signal transferred by the transfer transistor 103B is stored in the node capacitor FD1B. Thus, the photoelectric conversion signal generated by the photoelectric converter 101B, that is, the signal voltage associated with the photoelectric conversion signal stored in the node capacitor FD1B, is output to the in-pixel clamp capacitor 113 via the shared signal line 200 and the in-substrate coupler 13. Then, the in-clamp capacitor 113 outputs the difference between the signal voltage of the photoelectric converter 101B at the reset level and the signal voltage associated with the photoelectric conversion signal generated by the photoelectric converter 101B, that is, the signal voltage having been subjected to the noise reduction process.

Then, the vertical reading control circuit 20 changes the control signal φTX1B to "L" level, thereby terminating the transfer of the photoelectric conversion signal generated by the photoelectric converter 101B to the gate terminal of the first amplifier transistor 106B. At a time t11, the vertical reading control circuit 20 changes the control signal φSHP2B to "L" level, thereby terminating the sample hold by the electric charge storing unit 110B. Thereby, the electric charge storing unit 110B stores the signal charge having been subjected to the noise reduction process, which is output from the in-pixel clamp capacitor 113.

Then, at a time t12, the vertical reading control circuit 20 controls the control signal φVDB, thereby changing to the level of the reference voltage GND, the drain terminals of the pixel reset transistor 105B and the first amplifier transistor 106B. Then, at a time t13, the vertical reading control circuit 20 changes the control signal φRST1B to "H" level, thereby turning on the pixel reset transistor 105B. Thus, the voltage of the photoelectric conversion signal generated by the photoelectric converter 101B, which is stored in the node capacitor FD1B, that is, the voltage remaining in the node capacitor FD1B after being output to the in-pixel clamp capacitor 113, is cleared to the level of the reference voltage GND. Thereby, the voltage of the gate terminal of the first amplifier transistor 106B is lowered in level. Thus, the signal voltage associated with the photoelectric conversion signal generated by the photoelectric converter 101B is not output from the first amplifier transistor 106B, thereby disconnecting the first amplifier transistor 106B from the shared signal line 200. Then, the vertical reading control circuit 20 changes the control signal φRST1B to "L" level.

Then, at a time t14, the vertical reading control circuit 20 controls the control signal φBIAS, thereby terminating the operation of the pixel load transistor 112 as the load for the first amplifier transistor 106.

So far, the photoelectric conversion signals generated by the photoelectric converters in the remaining half of all the pixels in the solid-state image pickup device 1a, that are, the photoelectric conversion signals generated by the photoelectric converters 101B arranged in even-numbered rows of the pixel array unit 40, among the photoelectric converters 101 arranged in all the unit pixels 52 included in the pixel array unit 40, have been subjected to the noise reduction process and stored in the electric charge storing unit 110B. Here, in a case where the unit pixel 52 further includes more photoelectric converters 101 and circuit elements associated with those photoelectric converters 101, subsequently, the signal voltages obtained by subjecting photoelectric conversion signals generated by the other (remaining) photoelectric converters 101 to a noise reduction process are stored in the associated electric charge storing units 110 in a similar manner.

Then, the vertical reading control circuit 20 controls the control signals φSEL2 (the control signals φSEL2A and φSEL2B in the case of the second embodiment) row by row. Thus, the vertical reading control circuit 20 sequentially outputs to the vertical signal line 90, the signal voltages having been subjected to the noise reduction process, which are stored in the electric charge storing units 110 (the electric charge storing units 110A and 110B in the case of the second embodiment).

As explained above, similarly to the unit pixel 50 of the pixel array unit 40 in the solid-state image pickup device 1 according to the first embodiment, the unit pixel 52 of the pixel array unit 40 in the solid-state image pickup device 1a according to the second embodiment performs the noise reduction process on the photoelectric conversion signals generated by the photoelectric converters 101 arranged in all the unit pixels 52 and stores the signal voltages having been subjected to the noise reduction process in the electric charge storing units 110. Then, the unit pixel 52 sequentially outputs to the vertical signal line 90, as pixel signals, the signal voltages having been subjected to the noise reduction process. Additionally, similarly to the solid-state image pickup device 1 according to the first embodiment, the solid-state image pickup device 1a according to the second embodiment instantaneously performs the operation of reading the photoelectric conversion signals from the photoelectric converters 101 arranged in all the unit pixels 52 (two reading operations for the odd-numbered rows and the even-numbered rows in the case of the second embodiment). For this reason, the solid-state image pickup device 1a of the second embodiment can achieve a similar effect to that achieved by the solid-state image pickup device 1 of the first embodiment.

Additionally, the unit pixel 52 of the pixel array unit 40 in the solid-state image pickup device 1a according to the second embodiment does not include the pixel shared transistors 102A and 102B, which are included in the unit pixel 50 of the first embodiment. In other words, the number of the circuit elements included in the unit pixel 52 is decreased to be smaller than that of the circuit elements included in the unit pixel 50. Thus, according to the unit pixel 52 of the second embodiment, the area of the photoelectric converters 101 to be arranged in the unit pixel 52 can be made larger than that of the photoelectric converters 101 to be arranged in the unit pixel 50 of the first embodiment. Thereby, according to the unit pixel 52 of the second embodiment, it is possible to further enhance the signal quality of pixel signals to be output, compared to the unit pixel 50 of the first embodiment.

Similarly to the unit pixel 50 of the first embodiment, the unit pixel 52 of the second embodiment includes two photoelectric converters 101 and two circuit elements respectively associated with the two photoelectric converters 101. However, the configuration of one unit pixel is not limited to the configuration of the unit pixel 52 of the second embodiment.

Alternatively, similar to the unit pixel 50 of the first embodiment, one unit pixel may include more photoelectric converters and circuit elements associated with those photoelectric converters, and the first amplifier transistors may share the shared signal line 200. Even in this case, the solid-state image pickup device 1a of the second embodiment can achieve a similar effect to that achieved by the solid-state image pickup device 1 of the first embodiment by performing multiple number of times corresponding to the number of photoelectric converters in the unit pixel, the operation of reading the photoelectric conversion signals from the photoelectric converters and the operation of storing the signals having been subjected to the noise suppression (signals having been subjected to the noise reduction process), as the processes from the time t2 to t7 or the processes from the time t8 to t13 shown in FIG. 6.

As explained above, according to the embodiments of the present invention, each unit pixel in the pixel array unit included in the solid-state image pickup device is formed separately for first and second substrates, thereby making it possible to prevent an increase in the area of the chip of the solid-state image pickup device.

As explained above, each unit pixel of the solid-state image pickup device according to the embodiments of the present invention performs the noise reduction process on the photoelectric conversion signals generated by the photoelectric converters on the first substrate and stores the signal voltages having been subjected to the noise reduction process in the electric charge storing units on the second substrate. Then, each unit pixel 52 sequentially outputs, as pixel signals, the signal voltages resulting from the noise reduction process. Thus, it is possible for the unit pixel to suppress the effect of the noise due to the light entering the unit pixel 52 during an idle period. The idle period is a period until the signal voltages having been subjected to the noise reduction process and stored in the electric charge storing units 110 are read as pixel signals.

Further, each unit pixel of the solid-state image pickup device according to the embodiments of the present invention includes multiple photoelectric converters and circuit elements associated with the photoelectric converters. When the photoelectric conversion signals generated by the photoelectric converters arranged on the first substrate are output to the storing circuits on the second substrate, those photoelectric conversion signals are amplified and output. Thus, each unit pixel can suppress the noise due to the leak current (dark current) generated in the electric charge storing units arranged on the second substrate. Additionally, in each unit pixel, the signal line for outputting the amplified photoelectric conversion signals from the first substrate to the second substrate is shared among multiple rows of the pixel array unit, and the amplified photoelectric conversion signals are sequentially selected and output to the storing circuits 12 on the second substrate. Thus, it is possible to reduce the number of inter-substrate couplers and in-pixel clamp capacitors to be arranged in the unit pixel. Additionally, the area of the electric charge storing units arranged on the second substrate is increased, thereby making it possible to suppress the effect of the leak current (dark current) generated in the electric charge storing units. Thus, the solid-state image pickup device according to the embodiments of the present invention can suppress deterioration of the signal quality caused by the noises due to the leak current (dark current) generated in the electric charge storing units.

According to the embodiments of the present invention, each unit pixel of the solid-state image pickup device simultaneously performs operation of reading the photoelectric conversion signals generated by the photoelectric converters arranged on the first substrate, when the amplified photoelectric conversion signals are output from the first substrate to the second substrate. Thus, the solid-state image pickup device can store the read photoelectric conversion signals in the electric charge storing units 110 on the second substrate at substantially the same timing with the timing for the conventional solid-state image pickup device with the global shutter function. Thereby, it is possible to achieve substantially the same synchronism of generation and storing of photoelectric conversion signals, as that for the conventional solid-state image pickup device with the global shutter function.

According to the embodiments of the present invention, in each unit pixel of the solid-state image pickup device, the signal line for outputting the amplified photoelectric conversion signals from the first substrate to the second substrate is shared among the multiple rows of the pixel array unit. Therefore, the number of inter-substrate couplers for coupling the first and second substrates can be reduced by the number of those shared rows. Accordingly, it is possible to make larger the connection pitch of the two adjacent inter-substrate couplers in the pixel array unit. Thus, it is possible to suppress a decrease in the yield which occurs when the first and second substrates are coupled. Additionally, it is possible to make the size of the inter-substrate coupler larger by making the connection pitch of two adjacent inter-substrate couplers larger, thereby further suppressing the deterioration of the yield.

The specific configuration of the present invention is not limited to the above embodiments, and various modifications may be made without departing from the scope of the present invention. For example, it is possible to apply the concept of the present invention to a generally known method of arranging multiple photoelectric converters in one unit pixel.

Third Embodiment

Here, explanations are given with respect to a case where the concept of the present invention is applied to a generally known method of arranging multiple photoelectric converters in one unit pixel. Regarding a unit pixel of a solid-state image pickup device 1b according to a third embodiment of the present invention, multiple photoelectric converters are arranged in one unit pixel by a conventional method of sharing one amplifier transistor among photoelectric conversion signals having not yet been amplified, and the concept of the first embodiment of the present invention that a signal line for outputting signals from the first substrate to the second substrate is shared among multiple rows is applied.

Regarding the solid-state image pickup device 1b of the third embodiment, a circuit configuration of a unit pixel in a pixel array unit differs from the circuit configuration of the unit pixel 50 in the pixel array unit 40 in the solid-state image pickup device 1 shown in FIG. 2. Because of the difference in the circuit configuration of the unit pixel, a method for a vertical reading control circuit included in the solid-state image pickup device 1b of the third embodiment to control the unit pixel differs from the method for the vertical reading control circuit included in the solid-state image pickup device 1 of the first embodiment to control the unit pixel. However, those skilled in the art will easily understand the method for the vertical reading control circuit included in the solid-state image pickup device 1b of the third embodiment, by combining the conventional control method and the method for the vertical reading control circuit 20 included in the solid-state image pickup device 1 of the first embodiment. Therefore, detailed explanations thereof are omitted here.

The other constituent elements included in the solid-state image pickup device 1*b* of the third embodiment have similar configurations to those of the constituent elements included in the solid-state image pickup device 1 of the first embodiment. Therefore, like reference numerals are appended to like constituent elements between the solid-state image pickup device 1*b* of the third embodiment and the solid-state image pickup device 1 of the first embodiment, and explanations thereof are omitted here. Hereinafter, a unit pixel of the pixel array unit 40 included in the solid-state image pickup device 1*b* of the second embodiment is denoted as a "unit pixel 53."

Figure 7:
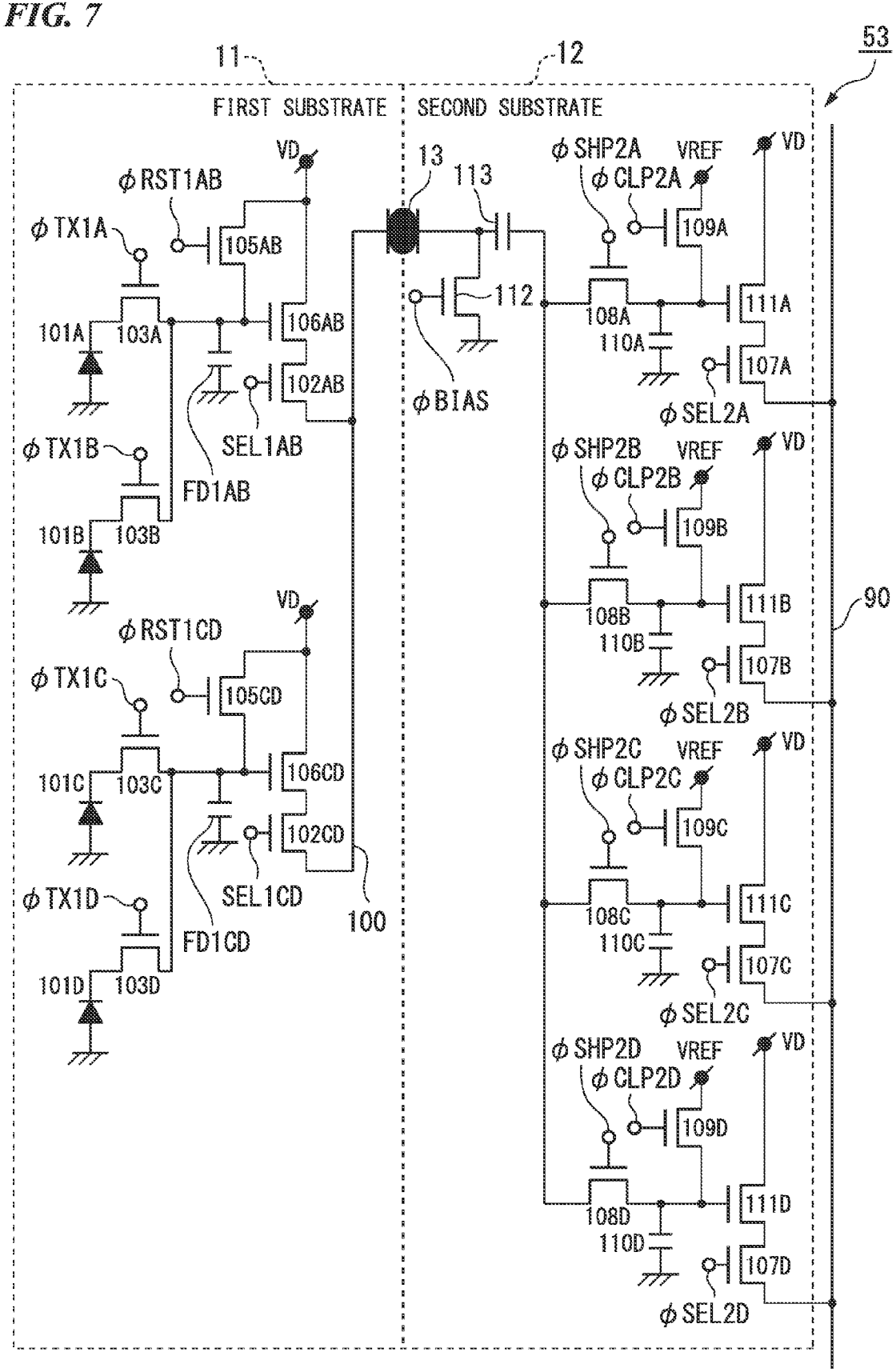
FIG. 7 is a circuit diagram illustrating a schematic configuration of a unit pixel included in a pixel array unit of a solid-state image pickup device according to a third embodiment of the present invention.

FIG. 7 is a circuit diagram illustrating a schematic configuration of the unit pixel 53 of the pixel array unit 40 included in the solid-state image pickup device 1*b* of the second embodiment. Similarly to the unit pixel 50 shown in FIG. 3, the unit pixel 53 converts incident light into a pixel signal, and outputs the pixel signal associated with the incident light to the vertical signal line 90 in accordance with the control signal received from the vertical reading control circuit 20. One unit pixel 53 is shown in FIG. 7. Regarding the solid-state image pickup device 1*b* of the third embodiment, as shown in FIG. 7, each circuit element in each unit pixel 53 is allocated either on the pixel unit 11 on the first substrate or the storing circuit 12 on the second substrate. Hereinafter, like reference numerals are appended to like circuit elements between the circuit elements of the unit pixel 53 and the circuit elements of the unit pixel 50 shown in FIG. 3.

In FIG. 7, the unit pixel 53 includes: photoelectric converters 101A and 101B; pixel shared transistors 102AB and 102CD; transfer transistors 103A to 103D; pixel reset transistors 105AB and 105CD; first amplifier transistors 106AB and 106CD; select transistors 107A to 107D; in-pixel sample-hold transistors 108A to 108D; in-pixel clamp transistors 109A to 109D; electric charge storing units 110OA to 110D; second amplifier transistors 111A to 111D; a pixel load transistor 112; and an in-pixel clamp capacitor 113. The photoelectric converters 101A and 101B, the pixel shared transistors 102AB and 102CD, the transfer transistors 103A to 103D, the pixel reset transistors 105AB and 105CD, and the first amplifier transistors 106AB and 106CD are placed on the first substrate. The select transistors 107A to 107D, the in-pixel sample-hold transistors 108A to 108D, the in-pixel clamp transistors 109A to 109D, the electric charge storing units 110A to 110D, the second amplifier transistors 111A to 111D, the pixel load transistor 112, and the in-pixel clamp capacitor 113 are placed on the second substrate. The pixel unit 11 of the first substrate and the storing circuit 12 of the second substrate are coupled via an inter-substrate coupler 13.

FIG. 7 shows an example of the unit pixel 53 including four photoelectric converters (photoelectric converters 101A to 101D). In FIG. 7, a reference symbol of any one of "A" to "D" is appended to the reference numeral of each circuit element of the unit pixel 53, thus representing a row of the pixel array unit 40 in which that circuit element is placed. More specifically, among the appended reference symbols "A" to "D", "A" represents circuit elements placed in the first row of the pixel array unit 40, "B" represents circuit elements placed in the second row of the pixel array unit 40. "C" represents circuit elements placed in the third row of the pixel array unit 40. "D" represents circuit elements placed in the fourth row of the pixel array unit 40. The reference numerals appended with any two of the reference symbols "A" to "D" represent circuit elements in two rows of the pixel array unit 40. Hereinafter, when explanations are given without specifying a row of the pixel array unit 40, only the reference number is mentioned without appending thereto any reference symbol of "A" to "D".

In the unit pixel 53, the photoelectric converters 101A and 101B share the first amplifier transistor 106AB. The photoelectric converters 101C and 101D share the first amplifier transistor 106CD. In other words, the first amplifier transistor 106AB outputs the signal voltage associated with the photoelectric conversion signal generated by the photoelectric converter 101A or 101B, which is transferred to the gate terminal. The first amplifier transistor 106CD outputs the signal voltage associated with the photoelectric conversion signal generated by the photoelectric converter 101C or 101D, which is transferred to the gate terminal. This configuration is the generally known method of arranging multiple photoelectric converters in one unit pixel.

In the unit pixel 53, the pixel shared transistor 102AB and 102CD share the shared signal line 100 and the inter-substrate coupler 13. In other words, in accordance with the control signals φSEL1AB and φSEL1CD received from the vertical reading control circuit 20, each of the pixel shared transistors 102AB and 102CD outputs to the inter-substrate coupler 13 via the shared signal line 100, the signal voltage output from one of the first amplifier transistors 106AB and 106CD. This configuration is a configuration applied with the concept of the first embodiment such that the signal line for outputting signals from the first substrate to the second substrate is shared among multiple rows of the pixel array unit.

Thus, the unit pixel 53 selectively reads to the inter-substrate coupler 13, the signal voltages associated with the photoelectric conversion signals generated by the four photoelectric converters 101A to 101D performing photoelectric conversion on incident lights, respectively. Then, the unit pixel 53 stores the signals having been subjected to the noise suppression (signals having been subjected to the noise reduction process) in the electric charge storing units 110A to 110D respectively associated with the photoelectric converters 101A to 101D. Then, the unit pixel 53 sequentially reads to the vertical signal line 90, as pixel signals, the signal voltages associated with the signals having been subjected to the noise suppression (signals having been subjected to the noise reduction process) stored in the respective electric charge storing units 110A to 110D.

As explained above, similarly to the unit pixel 50 of the first embodiment, the unit pixel 53 of the pixel array unit 40 in the solid-state image pickup device 1*b* according to the third embodiment performs the noise reduction process on the photoelectric conversion signals generated by the photoelectric converters 101 arranged in all the unit pixels 53 and stores the signal voltages having been subjected to the noise reduction process in the respective electric charge storing units 110. Then, the unit pixel 53 sequentially outputs to the vertical signal line 90, as pixel signals, the signal voltages having been subjected to the noise reduction process.

In the unit pixel 53 of the pixel array unit 40 in the solid-state image pickup device 1*b* according to the third embodiment, one amplifier transistor is shared among the photoelectric conversion signals having not been amplified, by a generally known method. Thus, the number of circuit elements included in the unit pixel 53 is reduced to be smaller than the number of circuit elements included in the unit pixel 50 of the first embodiment. Thereby, according to the unit pixel 53 of the third embodiment, the area of the photoelectric converters 101 to be arranged in the unit pixel 53 can be made larger than that of the photoelectric converters 101 to be arranged in the unit pixel 50 of the first embodiment. Thus, it is possible to further enhance the signal quality of pixel signals to be output, compared to the unit pixel 50 of the first embodiment.

The unit pixel 53 shown in FIG. 7 has the configuration such that the concept of the first embodiment is applied to the conventional method of arranging multiple photoelectric converters in one unit pixel. However, the concept of the second embodiment, in lieu of the concept of the first embodiment, may be applied to the conventional method.

In a case where the concept of the first or second embodiment is applied to the conventional method of arranging multiple photoelectric converters in one unit pixel, the number of photoelectric converters which share one amplifier transistor by the conventional method is preferably a number such that the capacitance of a capacitor associated with the node coupled to the gate terminal of the amplified transistor (the node capacitors FD1AB or FD1CD in the case of FIG. 7) is not too large. This is because as the capacitance of the capacitor associated with the node coupled to the gate terminal of the amplified transistor increases, the voltage of the photoelectric conversion signal generated by each photoelectric converter is lowered, thereby causing an increase in noise and therefore causing deterioration of the signal quality. According to the conventional method, generally, the number of photoelectric converters which share one amplifier transistor is preferably 2 to 4. In a case where 4 or more photoelectric converters are arranged in one unit pixel, it is preferable to employ the configuration such that photoelectric conversion signals having been amplified by the amplifier transistor are shared, as the configuration of the unit pixel 53 shown in FIG. 7.

The specific circuit configuration and the specific driving method of the present invention are not limited to the above embodiments, and various modifications may be made without departing from the scope of the present invention. For example, even in a case where a change in the circuit elements or the driving method of the unit pixel cause a change in the constituent elements or the circuit configuration of the solid-state image pickup device or the unit pixel, or in a case where the method for the vertical circuit controlling circuit to control the unit pixel is changed, it is possible to employ the concept of the present invention according to the changed driving or controlling method, and thus allocate each constituent element either on the first or second substrate.

The arrangement of the unit pixels in the column and row directions are not limited to those explained in the above embodiments. The number of unit pixels in the row and column directions may be changed without departing from the scope of the present invention.

Although the embodiments of the present invention have been explained with reference to the drawings, it is apparent that the present invention is not limited to the above embodiments, and may be modified without departing from the scope and spirit of the invention.

For example, in the solid-state image pickup device according to the embodiments of the present invention, two substrates may be coupled by a coupler. Alternatively, three or more substrates may be coupled by a coupler. In a case where the solid-state image pickup device has a configuration such that three or more substrates are coupled by a coupler, any two of the substrates correspond to the first and second substrates of the claimed invention.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:

1. A solid-state image pickup device comprising:
   first and second substrates on which circuit elements constituting a pixel are arranged; and
   a coupler electrically coupling the first and second substrates;
   wherein the pixel comprises:
   n photoelectric conversion elements on the first substrate where n is an integer of two or more, the n photoelectric conversion elements being configured to respectively generate n electric conversion signals;
   n amplifier circuits on the first substrate, the n amplifier circuits being configured to amplify the n electric conversion signals and output n amplified signals, respectively;
   n signal storing circuits on the second substrate, the n signal storing circuits being respectively associated with the n photoelectric conversion elements, the n signal storing circuits being configured to respectively store the n amplified signals;
   an output circuit on the second substrate, the output circuit being configured to sequentially output the n amplified signals respectively stored in the n signal storing circuits, as output signals from the pixel; and
   an analog-to-digital (AD) conversion circuit connected to the output circuit, the analog-to-digital (AD) conversion circuit being configured to convert the n amplified signals from analog signals into digital signals after outputting the n amplified signals from the n signal storing circuits,
   wherein the n photoelectric conversion elements are grouped into one or more groups based on arrangement positions thereof on the first substrate, and
   the coupler electrically couples a pixel output node to which the n amplified signals are output, to the n signal storing circuits.

2. The solid-state image pickup device according to claim 1, further comprising:
   n switches on the first substrate, the n switches being respectively associated with the n amplified circuits,
   wherein the n amplified signals are respectively output to the pixel output node via the n switches, and
   the n switches are respectively controlled to switch whether or not the n amplified signals are output to the pixel output node.

3. The solid-state image pickup device according to claim 1, wherein the n amplifier circuits directly outputs the n amplified signals to the pixel output node,
   n bias voltages are respectively supplied to the n amplified circuits, and
   the n bias voltages are respectively controlled to switch whether or not the n amplifier circuits output the n amplified signals to the pixel output node.

4. The solid-state image pickup device according to claim 2, wherein the pixel comprises n reset circuits on the first substrate, the n reset circuits being respectively associated with the n photoelectric conversion elements, and n reset circuits being configured to respectively reset the n photoelectric conversion signals generated by the n photoelectric conversion elements, the solid-state image pickup device further comprises a plurality of pixels having the same configuration as that of the pixel, all the n photoelectric conversion elements included in each of the pixels are reset simultaneously, a process of outputting the n amplified signals to the pixel output node is performed n times, for each of the one or more groups, simultaneously for all the pixels, after a predetermined period elapses.

5. The solid-state image pickup device according to claim 4, wherein the n signal storing circuits comprises n noise reduction circuits configured to reduce noise included in the n amplified signals output, respectively.

6. The solid-state image pickup device according to claim 4, wherein the n signal storing circuits configured to store, as the n amplified signals, noise-reduced signals output from the n noise reduction circuits.

7. An image pickup device comprising:
first and second substrates on which circuit elements constituting a pixel are arranged; and
a coupler electrically coupling the first and second substrates;
wherein the pixel comprises:
n photoelectric conversion elements on the first substrate where n is an integer of two or more, the n photoelectric conversion elements being configured to respectively generate n electric conversion signals;
n amplifier circuits on the first substrate, the n amplifier circuits being configured to amplify the n electric conversion signals and output n amplified signals, respectively;
n signal storing circuits on the second substrate, the n signal storing circuits being respectively associated with the n photoelectric conversion elements, the n signal storing circuits being configured to respectively store the n amplified signals;
an output circuit on the second substrate, the output circuit being configured to sequentially output the n amplified signals respectively stored in the n signal storing circuits, as output signals from the pixel; and
an analog-to-digital (AD) conversion circuit connected to the output circuit, the analog-to-digital (AD) conversion circuit being configured to convert the n amplified signals from analog signals into digital signals after outputting the n amplified signals from the n signal storing circuits,
wherein the n photoelectric conversion elements are grouped into one or more groups based on arrangement positions thereof on the first substrate, and
the coupler electrically couples a pixel output node to which the n amplified signals are output, to the n signal storing circuits.

8. A solid-state image pickup device comprising:
first and second substrates on which circuit elements constituting a pixel;
a coupler electrically coupling the first and second substrates;
a first photoelectric conversion element on the first substrate, the first photoelectric conversion element being configured to perform photoelectric conversion on a first incident light to generate a first signal;
a first amplifier circuit on the first substrate, the first amplifier circuit being coupled in series to the first photoelectric conversion element, and the first amplifier circuit being configured to amplify the first signal to generate a first amplified signal and output the first amplified signal to the coupler;
a first storing circuit on the second substrate, the first storing circuit being configured to store the first amplified signal;
an output circuit on the second substrate, the output circuit being configured to sequentially output the first amplified signal stored; and
an analog-to-digital (AD) conversion circuit connected to the output circuit, the analog-to-digital (AD) conversion circuit being configured to convert the first amplified signal from an analog signal into a digital signal after outputting the first amplified signal from the first signal storing circuit.

9. The solid-state image pickup device according to claim 8, further comprising:
a second photoelectric conversion element on the first substrate, the second photoelectric conversion element being configured to perform photoelectric conversion on a second incident light to generate a second signal; and
a second amplifier circuit on the first substrate, the second amplifier circuit being coupled in series to the second photoelectric conversion element, the second amplifier circuit being coupled in parallel to the first photoelectric conversion element, and the second amplifier circuit being configured to amplify the second signal to generate a second amplified signal and output the second amplified signal to the coupler; and
a second storing circuit on the second substrate, the second storing circuit being configured to store the second amplified signal,
wherein the output circuit is configured to sequentially output the second stored amplified signal.

10. The solid-state image pickup device according to claim 9, further comprising:
a control circuit configured to control the first and second amplifier circuits to selectively output the first and second amplified signals to the coupler, the control circuit being configured to control the output circuit to selectively output the first and second stored amplified signals.

11. The solid-state image pickup device according to claim 9, further comprising:
a third photoelectric conversion element on the first substrate, the third photoelectric conversion element being coupled in parallel to the first photoelectric conversion element, and the third photoelectric element being configured to perform photoelectric conversion on a third incident light to generate a third signal; and
a third storing circuit on the second substrate, the third storing circuit being coupled in parallel to the first and second storing circuits, the third storing circuit being configured to store a third amplified signal generated by the first amplifier circuit and output by the first amplifier circuit to the coupler,
wherein a control circuit is configured to control the first amplifier circuit to selectively amplify the first and third signals.

12. The solid-state image pickup device according to claim 11, further comprising:

a fourth photoelectric conversion element on the first substrate, the fourth photoelectric conversion element being coupled in parallel to the second photoelectric conversion element, and the fourth photoelectric element being configured to perform photoelectric conversion on a fourth incident light to generate a fourth signal; and a fourth storing circuit on the second substrate, the fourth storing circuit being coupled in parallel to the first to third storing circuits, the fourth storing circuit being configured to store a fourth amplified signal generated by the second amplifier circuit and output by the second amplified circuit to the coupler, wherein the control circuit is configured to control the second amplifier circuit to selectively amplify the second and fourth signals, the control circuit is configured to control the first to fourth amplifier circuits to selectively output the first to fourth amplified signals to the coupler, and the control circuit is configured to control the output circuit to selectively output the first to fourth stored amplified signals.

13. The solid-state image pickup device according to claim 10, wherein the first amplifier circuit comprises a first switch, the second amplifier circuit comprises a second switch, and the first and second switches are controlled to selectively output the first and second amplified signals to the coupler.

14. The solid-state image pickup device according to claim 10, wherein a first bias voltage is supplied to the first amplified circuit, a second bias voltage is supplied to the second amplified circuit, and the first and second bias voltages are controlled to selectively output the first and second amplified signals to the coupler.

15. The solid-state image pickup device according to claim 8, wherein the first storing circuit is configured to reduce noise included in the first amplified signal, and store the first amplified signal from which the noise is reduced.

16. A signal reading method comprising:

performing photoelectric conversion on a first incident light to generate a first signal, the first incident light entering a first photoelectric conversion element on a first substrate of two substrates on which circuit elements constituting a pixel are arranged;

amplifying the first signal to generate a first amplified signal;

outputting the first amplified signal to a coupler electrically coupling the first and second substrates;

storing the first amplified signal in a first storing circuit on a second substrate of the two substrates;

sequentially outputting the first amplified signal stored in the first storing circuit; and converting the first amplified signal from an analog signal into a digital signal, after outputting the first amplified signal from the first storing circuit.

17. The signal reading method according to claim 16, further comprising:

performing photoelectric conversion on a second incident light to generate a second signal, the second incident light entering a second photoelectric conversion element on the first substrate;

amplifying the second signal to generate a second amplified signal;

outputting the second amplified signal to the coupler;

storing the second amplified signal in a second storing circuit on the second substrate; and sequentially outputting the second stored amplified signal, wherein outputting the first amplified signal and outputting the second amplified signal are selectively performed, and sequentially outputting the first stored amplified signal and sequentially outputting the second stored amplified signal are selectively performed.

18. The signal reading method according to claim 17, further comprising:

performing photoelectric conversion on a third incident light to generate a third signal, the third incident light entering a third photoelectric conversion element on the first substrate, and the third photoelectric conversion element being coupled in parallel to the first photoelectric conversion element;

amplifying the third signal to generate a third amplified signal;

outputting the third amplified signal to the coupler;

storing the third amplified signal in a third storing circuit on the second substrate, the third storing circuit being coupled in parallel to the first and second storing circuits; and sequentially outputting the third stored amplified signal, wherein performing photoelectric conversion on the first incident light and performing photoelectric conversion on the third incident light are selectively performed.

19. The signal reading method according to claim 18, further comprising:

performing photoelectric conversion on a fourth incident light to generate a fourth signal, the fourth incident light entering a fourth photoelectric conversion element on the first substrate, and the fourth photoelectric conversion element being coupled in parallel to the second photoelectric conversion element;

amplifying the fourth signal to generate a fourth amplified signal;

outputting the fourth amplified signal to the coupler;

storing the fourth amplified signal in a fourth storing circuit on the second substrate, the fourth storing circuit being coupled in parallel to the first to third storing circuits; and sequentially outputting the fourth stored amplified signal, wherein performing photoelectric conversion on the second incident light and performing photoelectric conversion on the fourth incident light are selectively performed, and the first to fourth amplified signals are selectively output to the coupler.

20. The signal reading method according to claim 16, wherein storing the first amplified signal further comprises:

reducing noises included in the first amplified signal; and storing in the first storing circuit, the first amplified signal from which the noises are reduced.

* * * * *